United States Patent
MacDougall et al.

(10) Patent No.: US 9,448,635 B2
(45) Date of Patent: Sep. 20, 2016

(54) RAPID GESTURE RE-ENGAGEMENT

(71) Applicant: QUALCOMM Incorporated, San Diego, CA (US)

(72) Inventors: Francis B. MacDougall, Toronto (CA); Evan R. Hildreth, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 13/801,704

(22) Filed: Mar. 13, 2013

(65) Prior Publication Data

US 2013/0271397 A1 Oct. 17, 2013

Related U.S. Application Data

(60) Provisional application No. 61/624,953, filed on Apr. 16, 2012.

(51) Int. Cl.
*G06F 3/01* (2006.01)
*G06K 9/00* (2006.01)
*G06F 3/03* (2006.01)

(52) U.S. Cl.
CPC .............. *G06F 3/017* (2013.01); *G06F 3/0304* (2013.01); *G06K 9/00335* (2013.01); *G06K 9/00389* (2013.01)

(58) Field of Classification Search
CPC .... G06F 3/0304; G06F 3/017; G06F 3/0488; G06F 3/04883; G06F 2203/0338; G06K 9/00335; G06K 9/00389; G06K 2009/00395
USPC .................. 345/156, 173, 174, 175; 715/863
See application file for complete search history.

(56) References Cited

U.S. PATENT DOCUMENTS

| 5,360,971 | A | 11/1994 | Kaufman et al. |
| 7,180,500 | B2 | 2/2007 | Marvit et al. |
| 8,255,836 | B1* | 8/2012 | Gildfind .............. G06F 3/04812 345/173 |
| 2007/0266345 | A1* | 11/2007 | Cok ..................... G09G 3/3216 715/867 |
| 2009/0079813 | A1 | 3/2009 | Hildreth |
| 2009/0228841 | A1 | 9/2009 | Hildreth |
| 2010/0050134 | A1 | 2/2010 | Clarkson |
| 2010/0295781 | A1* | 11/2010 | Alameh ............... G06F 3/0346 345/158 |
| 2010/0306718 | A1* | 12/2010 | Shim ................... G06F 3/04883 715/863 |
| 2011/0074719 | A1* | 3/2011 | Yeh ..................... G06F 3/04883 345/173 |

(Continued)

FOREIGN PATENT DOCUMENTS

EP  2244166 A2  10/2010

OTHER PUBLICATIONS

International Search Report and Written Opinion—PCT/US2013/035000—ISA/EPO—Aug. 9, 2013.

(Continued)

*Primary Examiner* — Thomas Alunkal
(74) *Attorney, Agent, or Firm* — Kilpatrick Townsend & Stockton LLP

(57) ABSTRACT

Systems, methods, apparatuses, and computer-readable media are provided for use with a system configured to detect gestures. In one embodiment, a method includes detecting a first user gesture meeting a first condition to enter a mode of operation. The method may further include exiting the mode of operation. The method may further include detecting a second user gesture meeting a second condition to reenter the mode of operation based on the detecting the first user gesture, wherein the second condition is less stringent than the first condition.

32 Claims, 14 Drawing Sheets

(56) References Cited

U.S. PATENT DOCUMENTS

| | | |
|---|---|---|
| 2011/0102570 A1 | 5/2011 | Wilf et al. |
| 2011/0221666 A1 | 9/2011 | Newton et al. |
| 2012/0110518 A1* | 5/2012 | Chan .................. G06F 3/018 715/863 |
| 2012/0119985 A1* | 5/2012 | Kang .................. G06F 3/017 345/156 |
| 2012/0127089 A1* | 5/2012 | Waas .................. G06F 3/04883 345/173 |
| 2012/0169594 A1* | 7/2012 | Zhao .................. G09G 3/3406 345/158 |
| 2012/0229398 A1* | 9/2012 | Zaliva .................. G06F 3/04883 345/173 |
| 2012/0240041 A1* | 9/2012 | Lim .................. G06F 3/04883 715/702 |
| 2012/0262388 A1* | 10/2012 | Huang .................. G06F 3/04883 345/173 |
| 2012/0313848 A1 | 12/2012 | Galor et al. |
| 2013/0093705 A1* | 4/2013 | Huang .................. G06F 3/017 345/173 |
| 2013/0104089 A1* | 4/2013 | Rieffel .................. G06F 3/017 715/863 |

OTHER PUBLICATIONS

JoesiPodSupport's Channel: "ScreenDimmer: Save Battery Life on Your iDevice!", Jun. 20, 2011, p. 1, XP054975190, Retrieved from the Internet : URL:http://www.youtube.com/watch?v=3Dba0WMZ6BY.

* cited by examiner

RAPID GESTURE RE-ENGAGEMENT

CROSS-REFERENCE TO RELATED APPLICATIONS

This patent application claims the benefit of U.S. Provisional Patent Application Ser. No. 61/624,953 filed Apr. 16, 2012, and entitled "RAPID GESTURE RE-ENGAGEMENT," which is incorporated by reference herein in its entirety for all purposes.

BACKGROUND

Aspects of the disclosure relate to computing technologies. In particular, aspects of the disclosure relate to systems, methods, apparatuses, and computer-readable media that perform gesture recognition.

Increasingly, computing devices, such as smart phones, tablet computers, personal digital assistants (PDAs), and other devices, include touch screens, accelerometers, cameras, proximity sensors, microphones, and/or other sensors that may allow these devices to capture motion and/or other sensed conditions as a form of user input. In some devices, for instance, particular movements and/or occurrences may be recognized, for instance, as gestures that correspond to particular commands in different situations. For example, a device may recognize a gesture, such as a left swipe (e.g., in which a user waves their hand in front of the device to the left), as corresponding to a "previous page" command while a browser application is displayed and a "previous track" command while a media player application is displayed. In this example, a user may cause the device to execute these commands by performing the corresponding gestures in each of these situations.

Aspects of the disclosure provide more convenient, intuitive, and functional ways of performing gesture recognition. In a touch system, a user's finger touches a glass surface of a computing device, then moves in the direction of a gesture, and then lifts from the glass surface, giving a clear indication of the beginning and end of the gesture. In touch-free systems, there is not an inherently clear way to determine the beginning and end of a gesture.

Embodiments of the invention provide improved techniques to address these problems.

BRIEF SUMMARY

These problems and others may be solved according to embodiments of the present invention, described herein. Embodiments may solve problems associated with engaging a gesture control system and/or interpreting repetitive inputs provided to the system.

Systems, methods, apparatuses, and computer-readable media are provided for engaging and re-engaging a gesture mode for tracking gestures in succession. Some embodiments involve the computer system detecting the gestures where the user holds their hand still in a constant position, area, region or location. In other embodiments, the computer system detects that the user extremity such as a hand is posed in a specific manner (palm open, etc.). Another approach detects that the user is moving towards the original detected hand position but then changes direction and initiates a new gesture in the direction of the originally detected gesture. In some implementations, the computer system detects the steadiness of the human extremity in order to determine a gesture for engaging and re-engaging the gesture control system.

In some embodiments, a method includes detecting a first user gesture meeting a first condition to enter a mode of operation on a computing device. The method may further include exiting the mode of operation. The method may further include detecting a second user gesture meeting a second condition to reenter the mode of operation based on the detecting the first user gesture, wherein the second condition is less stringent than the first condition.

In some embodiments, the mode of operation is a gesture tracking mode comprising tracking the first user gesture or the second user gesture over a period of time.

In some embodiments, tracking the first user gesture or the second user gesture comprises using one or more of depth sensor tracking, 2-D sensor tracking, histogram tracking, and ultrasound sensor tracking.

In some embodiments, the mode of operation is a command mode comprising executing one or more commands.

In some embodiments, the detecting the first user gesture or the second user gesture comprises obtaining a plurality of images using an image sensor.

In some embodiments, the first and second user gestures are fixed gestures.

In some embodiments, the first and second user gestures are dynamic gestures.

In some embodiments, the first condition is detecting the first user gesture for a first period of time and the second condition is detecting the second user gesture for a second period of time, wherein the second period of time is shorter than the first period of time.

In some embodiments, the first condition is detecting the first user gesture within a first region and the second condition is detecting the second user gesture within a second region, wherein the second region is larger than or equal to the first region.

In some embodiments, the detecting the first user gesture comprises determining whether a user extremity is steady within the first region by detecting that any movement associated with the user extremity is below a predefined movement threshold in the first region for a period of time.

In some embodiments, the user extremity is a hand.

In some embodiments, the method further includes providing feedback indicating reentering the mode of operation in response to the detecting.

In some embodiments, the method further includes the second condition including a command corresponding to the second user gesture being equivalent to a command corresponding to a gesture performed between the first user gesture and the second user gesture. The method may further include bypassing a requirement for the second user gesture to meet the first condition based at least in part on the detecting the second user gesture meeting the second condition.

In some embodiments, the first condition comprises a motion or trajectory in a first direction, and wherein the second condition comprises a change in direction such that a resulting direction of motion is substantially aligned with the first direction.

In some embodiments, the method includes performing the detecting the first user gesture and the detecting the second user gesture in absence of a user touching the computing device.

In some embodiments, an apparatus includes an image capture device configured to capture images and a processor coupled to the image capture device. The processor may be configured to detect, a first user gesture meeting a first condition to enter a mode of operation. The processor may further be configured to exit the mode of operation. The processor may further be configured to detect, based on images, captured by the image capture device, a second user gesture meeting a second condition to reenter the mode of operation based on the detecting the first user gesture, wherein the second condition is less stringent than the first condition.

In some embodiments, an apparatus includes means for detecting a first user gesture meeting a first condition to enter a mode of operation. In some embodiments, an apparatus further includes means for exiting the mode of operation. In some embodiments, the apparatus further includes means for detecting a second user gesture meeting a second condition to reenter the mode of operation based on the detecting the first user gesture, wherein the second condition is less stringent than the first condition.

In some embodiments of the apparatus, the mode of operation is a gesture tracking mode comprising tracking the first user gesture or the second user gesture over a period of time.

In some embodiments of the apparatus, the apparatus further comprises means for tracking the first user gesture or the second user gesture using one or more of depth sensor tracking, 2-D sensor tracking, histogram tracking, and ultrasound sensor tracking.

In some embodiments of the apparatus, the mode of operation is a command mode comprising executing one or more commands.

In some embodiments of the apparatus, the first condition is detecting the first user gesture for a first period of time and the second condition is detecting the second user gesture for a second period of time, wherein the second period of time is shorter than the first period of time.

In some embodiments of the apparatus, the first condition is detecting the first user gesture within a first region and the second condition is detecting the second user gesture within a second region, wherein the second region is larger than or equal to the first region.

In some embodiments of the apparatus, the means for detecting the first user gesture or the means for detecting the second user gesture comprises means for obtaining a plurality of images using an image sensor.

In some embodiments of the apparatus, the first and second user gestures are fixed gestures.

In some embodiments of the apparatus, the first and second user gestures are dynamic gestures.

In some embodiments of the apparatus, means for detecting the first user gesture comprises means for determining whether a user extremity is steady within the first region by detecting that any movement associated with the user extremity is below a predefined movement threshold in the first region for a period of time.

In some embodiments of the apparatus, the user extremity is a hand.

In some embodiments of the apparatus, the first condition is detecting the first user gesture to a first confidence level and the second condition is detecting the second user gesture to a second confidence level, wherein the second confidence level is lower than the first confidence level.

In some embodiments of the apparatus, further comprising means for providing feedback indicating reentering the mode of operation in response to the detecting.

In some embodiments of the apparatus, the second condition comprises a command corresponding to the second user gesture being equivalent to a command corresponding to a gesture performed between the first user gesture and the second user gesture, and the apparatus further comprises means for bypassing a requirement for the second user gesture to meet the first condition based at least in part on the detecting the second user gesture meeting the second condition.

In some embodiments of the apparatus, the first condition comprises a motion or trajectory in a first direction, and the second condition comprises a change in direction such that a resulting direction of motion is substantially aligned with the first direction.

In some embodiments of the apparatus, the means for detecting the first user gesture detect the first user gesture and the means for detecting the second user gesture detect the second user gesture in absence of a user touching the computing device.

In some embodiments, a processor-readable medium includes processor-readable instructions configured to cause a processor to detect a first user gesture meeting a first condition to enter a mode of operation. The instructions may be further configured to cause the processor to exit the mode of operation. The instructions may be further configured to cause the processor to detect a second user gesture meeting a second condition to reenter the mode of operation based on the detecting the first user gesture, wherein the second condition is less stringent than the first condition.

In some embodiments, a method includes detecting a first engagement gesture. The method may further include detecting a first gesture after detection of the first engagement gesture. The method may further include detecting a second gesture. The method may further include determining that a command corresponding to the first gesture is equivalent to a command corresponding to the second gesture. The method may further include bypassing a requirement for a second engagement gesture based at least in part on the determining.

In some embodiments, a method for use with a system requiring engagement gestures includes detecting an engagement gesture, the engagement gesture including a first pose of a hand maintained for a first period of time at a first position. The method may further include detecting a first gesture subsequent to the detection of the engagement gesture, the first gesture including a first motion of the hand. The method may further include determining that the hand has substantially returned to the first position for a second period of time, the second period of time being less than the first period of time. The method may further include detecting a second gesture subsequent to determining that the hand has returned to the second position including a second motion of the hand.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
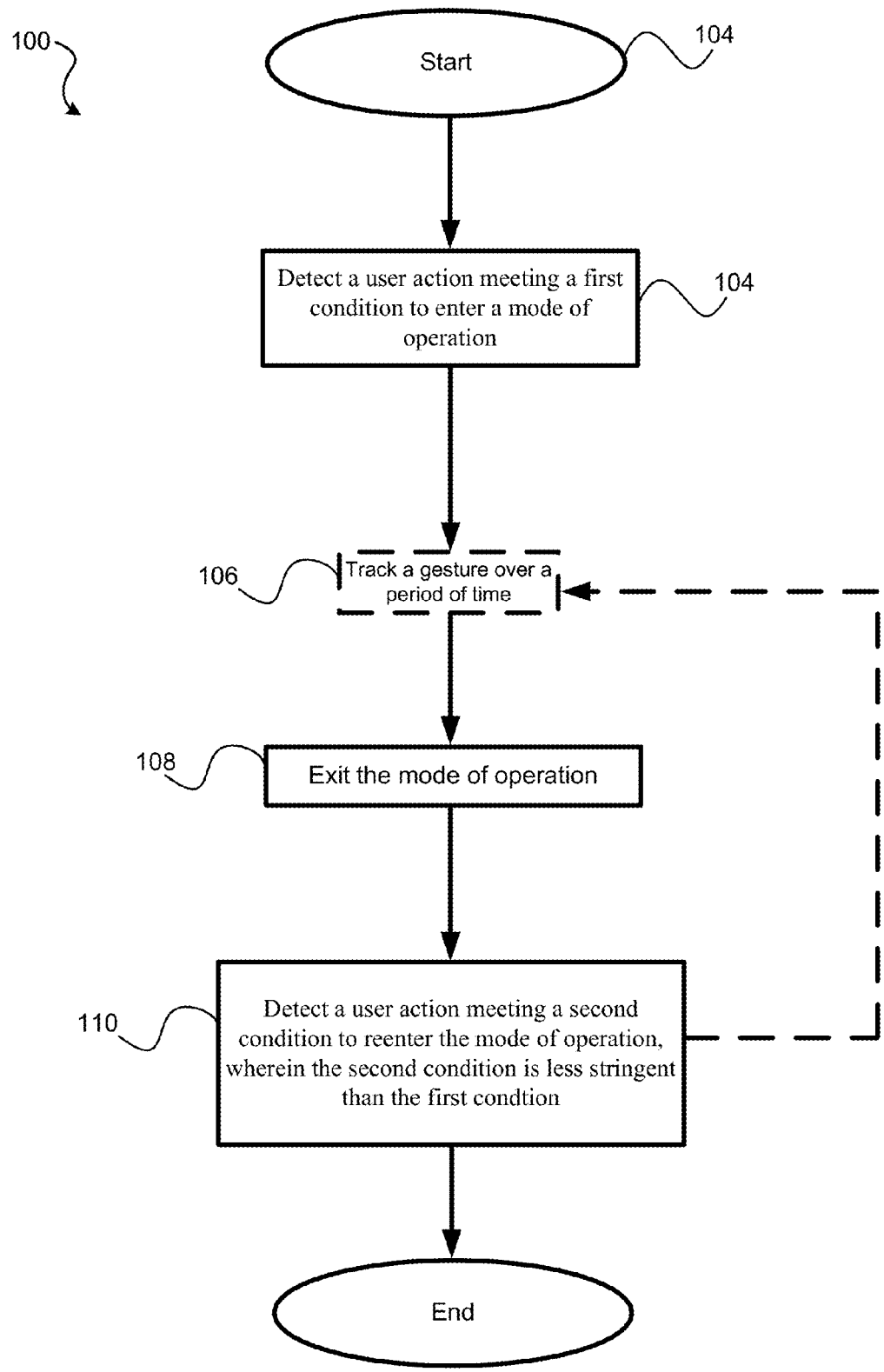
FIG. 1 is a flow diagram illustrating an exemplary embodiment of the invention for entering and exiting a mode of operation according to embodiments of the present invention.

Aspects of the disclosure provide more convenient, intuitive, and functional ways of performing gesture recognition. In a touch system, the finger touches a glass surface of a screen, and then moves in the direction of a gesture, and then lifts from the glass requiring touch interaction with the user. However, there are many situations where a user may not be able to or may not want to touch the screen in order to respond to a prompt. For example, a user may be driving a car and may not want to take their eyes off the road to touch a specific button or region in a user interface. These and many other scenarios point out the shortcoming of having interfaces which can be activated through touch.

For illustrative purposes, embodiments of the invention are described herein using a hand pose. However, any user extremity may be used for poses and gestures. In some embodiments, the user's body, face, or head may be used to perform a gesture. Those of skill in the art will recognize other gestures that may be performed. In some embodiments, a pose may comprise a type of gesture, and embodiments describing a gesture may be used when the gesture comprises a pose. Further, embodiments discussed with respect to a pose may be used with other gestures in some implementations. In some embodiments, a gesture or pose may be performed by a user and/or detected by a device or system without the user touching a screen of the device or system or otherwise contacting the device or system. For example, as described in additional detail below, a pose or gesture may be detecting using an image, ultrasound, and/or depth sensor in some embodiments.

Techniques for a method and apparatus for re-engagement of gesture control in a tracking system are described herein. An engagement gesture may include a user maintaining a particular pose for a pre-determined period of time, for example maintaining a human extremity such as a hand in a certain position or hand pose in order to engage the tracking system. An engagement pose allows a gesture system to ignore hand motions that are not intended to be control gestures and hence can make a system more robust. In some systems, user motions are ignored prior to detection of an engagement gesture. After the engagement gesture is detected, a gesture command may be identified from a user gesture. Thereafter, the system may return to ignoring user motions until a further engagement gesture is detected. The delay associated with an engagement gesture is generally acceptable to a user if the user is planning to only perform a single gesture, but requiring an engagement gesture prior to every gesture command may be inefficient if the user wants to make a series of gestures, say to swipe through a list of options or turn a series of pages in a virtual book.

Embodiments of the invention describe techniques for allowing the user to avoid a full re-engagement, such as a second engagement gesture, for repetitive gestures in succession. The systems, methods, apparatuses, and computer-readable media described may detect the return of a control object or human extremity such as a hand to a pre-determined region for re-engagement of additional gestures once the computer system detects and responds to a first gesture in a series of gestures.

Several implementations for embodiments of the invention are described in greater detail below. Some embodiments involve the computer system detecting a gesture where the user holds his hand still in a constant position, area, region or location. In other embodiments, the computer system detects the requirement that the user extremity such as a hand is posed in a specific way (palm open, etc.). Another approach detects that the user is moving towards the original detected hand position but then changes direction and initiates a new gesture in the direction of the originally detected gesture. In some implementations, the computer system detects the steadiness of the human extremity in order to determine a gesture for engaging the gesture control system. The pre-determined amount of time may be configurable so that a user may shorten the process depending on their preferences.

2D Sensor Tracking

One exemplary embodiment comprises capturing the scene in front of a computing system by capturing a plurality of images using a two-dimensional (2D) image sensor such as a camera and analyzing those images to identify a known hand pose (such as an open hand). One technique for identifying a hand-pose may be based on the Viola-Jones object detection framework; however, any suitable means for determining that the hand is present may be used. Once the computer system detects the hand in a hand-pose for a pre-determined period of time, an optional feedback mechanism may be used to signal to the user that a "gesture mode" has been engaged.

In some implementations, the computer system uses a gesture detection algorithm to determine the direction that the hand moves from the initial engagement location to effect a "swipe" left, right, up, or down. Some implementations may use one or more of Kanade-Lucas-Tomasi (KLT) tracking, histogram tracking, random decision forest, K-Means clustering and optical flow or any suitable algorithm for tracking the gestures. Once the computer system determines the swipe, the system may generate a swipe signal to the active application and the application would respond appropriately.

Next, the user may want to re-engage the system in order to do another swipe in rapid succession. In one embodiment, the computer system may facilitate re-engaging the gesture by detecting the user's hand back in the original tracking location or region (or an area within a threshold distance thereof) and into the desired hand pose to enable gesture detection again. In another embodiment, the computer system may detect that the hand is back in the pre-determined region without need of a specific hand-pose. In yet another embodiment, the computer system may detect either a hand or/and a hand-pose and also a pre-determined period of time of the hand at the pre-determined region to re-engage the gesture tracking system. For all the above engagement techniques, the computer system may provide the user with an optional feedback mechanism (sound or visual or otherwise) to signal the user that "gesture mode" has been re-engaged. The computer system may begin tracking for the next gesture and the process may continue. In some embodiments, the hand pose must be maintained for the pre-determined period of time before performing a gesture different than the determined swipe, but the swipe may be repeated even if the hand-pose is not maintained for the pre-determined period of time, for example as described above.

2D Sensor Tracking Using Optical Flow:

In one implementation, the computer system uses an optical flow object detection framework for tracking the gestures. In one instance of this method, a block of pixels, for example each 16×16 block of pixels in the captured image in the region of the detected hand and adjacent to it in all desired directions, may be analyzed from one frame to the next, and a best match may be found for the contents of each block in the next frame. This best match may be done using sum of absolute differences (SAD) techniques (for each pixel value), or may be done using any other suitable technique. The offset from the original position of a given 16×16 block from the previous frame to its position in the new frame can be represented as an (x,y) value which represents a vector of the motion of that block of pixels between the two frames. By accumulating the block motion data of the entire hand region, an accurate representation of the direction of motion of the hand can be determined Successive frames may provide a series of vectors of motion, and these could be accumulated to pass a threshold value to identify that a "swipe" action had occurred.

Once a swipe action has been detected by the computer system using this technique, it is possible to continue analyzing the extended region around the original detected hand location to find the "return gesture" as the hand comes back to the starting point. This technique may use the same 16×16 pixel optical flow approach used above to determine if there is an object moving into the original detected hand region. When this occurs, the computer system may provide optional feedback to the user, so that the user knows that the system is ready to detect a new swipe.

The computer system may detect the return position by detecting the return of the hand to a general region of the original or pre-determined region of the first gesture, thus providing flexibility to the user. In particular, the user may often "overshoot" the original hand detection region as they return. It may be undesirable to interpret this motion as a swipe in the opposite direction in some embodiments. To avoid this undesirable interpretation, the "rapid re-engagement" may apply to swipes in the same direction as the first detected swipe of a series. Therefore, in one implementation, a repeated gesture may be favored over a singular event in the opposite direction. In such an implementation, a re-engagement of the computer system using the hand pose detector may be needed to swipe in the opposite direction. Thus, the computer system may determine whether to execute a repeat gesture regardless of whether a repeated engagement gesture is detected. In some implementations, the computer system may determine to ignore or bypass a requirement for an engagement gesture when a repeat gesture is detected or when a return to a position of an initial engagement gesture is detected. In one embodiment, a gesture control system may require an engagement gesture prior to every gesture performed, but may bypass such requirement when a repeat gesture is being performed. In addition to the detection of repeat gestures discussed above, other methods of detecting repeat gestures, such as those discussed below, may be used.

2D Sensor Tracking Using Histogram Tracking:

In another implementation, the computer system uses histogram tracking techniques for tracking the gestures. In one instance of this method, the initial position of the hand is detected using the hand detector method as described herein. Once the hand position is known, a color sample may be taken of the hand or portion of the hand in a fixed size that is related to the size of the hand found by the detector. For instance, if the hand-pose was for an open hand then the computer system may sample only the colors in the palm of the hand. Hence the computer system may select a lower section of the found hand area as the color sample region. One implementation of the color sampling technique would reduce a color space, for example a 24 bit color space into an 8 bit lookup table that apportions all colors into one of 256 slots of a color table. The computer system may then create a histogram of the selected palm region by adding up a plurality of pixels for each slot in the palm region. This summation may result in a color signature of that palm sized region that may be based on the color distribution of the palm.

Similarly, in one implementation, for subsequent frames, the computer system may find the best match to that color signature in the frame. This may be done by creating a color histogram for each palm sized region of interest and finding the region that has the closest signature to the above sampled signature. The palm sized regions of interest could be substantially all in a single row of the frame, aligned with the original palm location in order to detect left and right swipes, or they could be substantially vertically aligned with the original palm detection region in order to detect up and down swipes, or they could be calculated for the entire frame. For each region, the calculated histogram may be compared against the reference palm histogram, for example using a straight sum of absolute differences, and the smallest difference may identify the best matching region in the new frame. Using this technique over several frames, the path of the hand can be detected and stored as a series of positions relative to the original palm position. These positions can be compared from one frame to the next and used to determine that a swipe has occurred if, for example, the hand position has moved a certain distance in a certain amount of time. Once the swipe has triggered then the histogram tracking in the computer system can continue until the hand has returned to the start location or region and a re-engagement can be signaled to the user so that they can rapidly swipe again. In one implementation, this method may favor subsequent swipes in the same direction, using a higher threshold of distance or even a full re-engagement in order to allow an opposite direction swipe. That is, in some embodiments, subsequent swipes in the same direction may be favored because they may be more likely to indicate an intended swipe by the user compared to a swipe in the opposite direction, which may be an accidental gesture. Thus, swipes in the opposite direction may require detection of movement over a longer distance or a full re-engagement, for example detection of an engagement pose for a full engagement time, prior to being acknowledged as commands.

Ultrasound Sensor Tracking:

In one implementation, embodiments of the invention involve detecting the presence of a hand in a region in front of the computer system or device using a collection of one or more ultrasound sensors. The position of the hand could be measured using the outputs from these sensors. For example the system may include one or more microphones sensitive to ultrasonic frequencies. The microphones may receive ultrasonic signals from an emitter, such as an ultrasound pen that is being used to perform gestures and emit ultrasonic waves, or the system may comprise an emitter that emits ultrasonic waves that are reflected off of a control object, such as a user's hand, and back to the microphones. It could be determined that the hand or other control object is being held steady in one location by comparing successive outputs from the ultrasound sensors over a preset amount of time. In one aspect, an optional feedback mechanism could be used to signal the user that "gesture mode" has been engaged.

Once the "gesture mode" is engaged, the computer system may receive the outputs from the ultrasound sensors and determine which direction the hand moves from the initial position in order to detect a "swipe" gesture to the left, right, up, or down. Once the computer system determines the swipe direction, the system may generate a swipe signal to the active application and the application may respond appropriately.

Next, the user may want to re-engage the system in order to perform another swipe in rapid succession. The computer system facilitates re-engagement by analyzing the output of the ultrasound sensors until the hand re-appears in the original tracking location or region. The system may then signal the user that "gesture mode" has been re-engaged, or a small delay may be added to verify that the user has stopped their hand in that location in order to verify that another gesture is desired. The computer system could then optionally signal the user that "gesture mode" has been re-engaged, and a search for additional "swipes" by the user.

Depth Sensor Tracking:

In one implementation, embodiments of the invention involve capturing a scene in front of a device by capturing images from a 3D image capture system that provides a depth map of the scene in front of the device. This depth data could be analyzed by the computer system to either identify that an object is in front of the device or in a more detailed analysis could determine that a hand is present and that it is being held in a specific hand pose (say an open hand). In one implementation, the computer system would detect a hand pose based on counting the fingers in the 3D image by analyzing the 3D depth data directly or any other suitable method. Once the computer system detects the presence of the hand for a pre-determined amount of time, an optional feedback mechanism may be used to signal the user that "gesture mode" has been engaged.

Once a "gesture mode" has been detected and engaged, a gesture detection algorithm could be used by the computer system to determine the direction that the hand moves from the initial engagement location to effect a "swipe" left, right, up, or down. In the case of a depth sensor, it may be possible to determine the absolute location of the hand in subsequent frames after the initial engagement, and the direction that the hand is moving may be used to determine the direction of the swipe. Once the swipe direction has been determined, the computer system may generate a swipe signal to the active application and the application may respond appropriately.

Next, the computer system may re-engage upon detecting another swipe in rapid succession. The computer system may facilitate re-engagement by analyzing the return of the hand in the original tracking location or region and/or in the desired hand pose to enable gesture mode again. In another approach, the computer system may detect that the user restores their hand to the original tracking location or region but not require the hand pose. In yet another approach, either of the above approaches may be used in conjunction with detecting the steadiness of the hand or/and hand pose in the original tracking location or region. In all of these, the computer system may provide an optional feedback mechanism (sound or visual or otherwise) to signal the user that "gesture mode" has been re-engaged. The computer system may begin tracking for the next gesture and the process may continue.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Rapid Gesture Re-Engagement

FIG. 1 is a flow diagram 100 illustrating an exemplary embodiment of the invention for entering and exiting a mode of operation according to embodiments of the present invention. The method is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

At block 102, the computer starts monitoring for gestures. At block 104, the computer system detects a user gesture meeting a first condition to enter a mode of operation. The user gesture may be detected by obtaining a plurality of images using an image sensor, for example camera 1420 (see FIG. 14), and/or input device 1408. In some embodiments, the mode of operation is a gesture tracking mode that includes detecting a user gesture and tracking the user gesture over a period of time (block 106). Tracking the gesture may be accomplished using any of the tracking methods described above, including but not limited to, ultrasound sensor tracking, depth sensor tracking, 2-D sensor tracking, and/or histogram tracking.

In another embodiment, the mode of operation may be a command mode including executing one or more commands on the computer system. In the command mode, the user gesture(s) may be interpreted by the computer system. These action(s) may be tied to specific commands for the computer system. The computer system may execute these commands and provide feedback to the user. For example, a user may hold their hand in a certain predefined position to flip a page in a virtual book being displayed on the computer system.

In some embodiments, the user gesture may be a fixed gesture. In another embodiment, the user gesture may be a dynamic gesture. A fixed gesture may be a predefined static pose performed by a user extremity. For example, a fixed gesture may be an open palm hand pose or a fist pose or an OK or peace sign. A dynamic gesture may be a predefined motion or trajectory performed by a user extremity. For example, a dynamic gesture may be a user performing a left-to-right swipe gesture. In some embodiments, a hand pose such as an open palm hand pose is maintained during the motion or trajectory.

At block 108, the computer system exits the mode of operation. After tracking the gesture over a period of time, the computer system may exit the mode of operation (gesture tracking mode and/or command mode). For example, the computer system exits the mode of operation after the user performs the user gesture. Once the user gesture is complete, the computer system may exit the gesture tracking mode and/or command mode. At this point, the computer system may no longer accept a gesture input.

At block 110, the computer system detects a user gesture meeting a second condition to reenter the mode of operation, for example using the camera 1420 and/or input device 1408. The second condition may be less stringent than the first condition. In some embodiments, the first condition is detecting the user gesture for a first period of time and the second condition is detecting the user gesture for a second period of time. The second period of time may be shorter than the first period of time. For example, the first condition would be met by a user performing a hand pose for a first predetermined period of time. After detecting the user gesture meeting the first condition and entering a mode of operation described above, the computer system may exit the mode of operation. At this point, the computer system may detect a user gesture meeting a second condition for a second period of time, where the second period of time is shorter than the first period of time. For example, the second condition may be met by a user performing a hand pose for a second predetermined period of time that is shorter than the first predetermined period of time. This is an example of the second condition being less stringent than the first condition. The user may hold the hand pose again for a time shorter than the first time the user held the hand pose. Upon detecting the user gesture meeting this second condition, the computer system may reenter the mode of operation (gesture tracking and/or command) to continue providing the user with interaction and feedback. Alternatively, if it is not detected that the user gesture meets the second condition, the method may end and gesture tracking may no longer continue. A user may then be required to fully re-engage the computer system prior to performing any subsequent gesture commands.

It can be appreciated that a decision to exit the mode of operation (block 108) may not be necessary. That is, the mode of operation may be exited (block 108) may be made at the time the user gesture meeting the second condition (block 110) is detected. In some embodiments, if the user gesture meeting the second condition (block 110) is never detected, the computer system may remain in the mode of operation entered upon detecting the user gesture meeting the first condition. In some embodiments, exiting the operational mode comprises reentering or reengaging the operational mode.

In some embodiments, the first condition is detecting the user gesture within a first region and the second condition is detecting the user gesture within a second region. The second region may be larger than. In some embodiments, the detecting includes determining whether a user extremity is steady within the first region by detecting a movement associated with the user extremity that is below a predefined movement threshold in the first region for a period of time. For example, the first condition would be met by a user performing a hand pose within a first region of a display device. After detecting the user gesture meeting the first condition and entering a mode of operation described above, the computer system may exit the mode of operation. At this point, the computer system may detect a user gesture meeting a second condition within a second region, where the second region is larger than the first region. For example, the second condition may be met by a user performing a hand pose within the second region of the display device that is larger than the first region of the display device. This is an example of the second condition being less stringent than the first condition. Upon detecting the user gesture meeting this second condition, the computer system may reenter the mode of operation (e.g., gesture tracking and/or command) to continue providing the user with interaction and feedback.

In some embodiments, the first condition is detecting a user gesture to a first predetermined confidence level and the second condition is detecting the user gesture to a second predetermined confidence level. The first and second predetermined confidence levels relate the computer system's confidence that a user is in fact performing an intended gesture, for example a fixed or a dynamic gesture. The confidence levels may be used by the system to filter out inadvertent user input. It can be appreciated that the first and second confidence levels may be minimum thresholds and conditions exceeding the minimum threshold may be considered to have met the first and second confidence levels. In some embodiments, the second confidence level may be lower than the first confidence level. In one example where the first and second conditions comprise confidence levels that a hand pose is being performed, a lower confidence may permit the user to perform a less definitive or more relaxed gesture, for example allowing their fingers to curl in during a second hand pose instead of holding the fingers straight out, as may be required of the first hand pose in some embodiments. In some embodiments, a lower threshold may permit the user to perform a dynamic gesture with less precision.

In some embodiments, the computer system may further provide feedback indicating reentering the mode of operation in response to the detecting. For example, after the computer system detects a user gesture meeting the second condition to reenter the mode of operation, the computer system may provide feedback to the user (via an output device such as a display), indicating that the mode of operation has been reentered. This feedback may provide the user with a visual and/or audible cue as to the computer system's present mode of operation.

In some embodiments, the computer system may further determine whether a command corresponding to the first user gesture is equivalent to a command corresponding to the second user gesture. The computer system may further bypass a requirement for the second user gesture to meet the second condition based at least in part on the determination. For example, if the user performs a first gesture meeting the first condition, e.g. performing a left-to-right swipe to indicate the user wishes to flip a page in a virtual book, and the user performs a second gesture equivalent to the first gesture, the computer system will respond by flipping another page in the virtual book without requiring the second gesture to meet the second condition. The second condition may be, for example, performing the gesture in relatively the same area of a display device. In some embodiments, the second condition may comprise a minimum length of the swipe. For example, if a user performs the left-to-right swipe with a hand and then returns the hand to an area within a threshold of a position where the swipe was started, then the system may detect that a second swipe was performed even if the second swipe does not meet a length requirement in some embodiments. In some embodiments, a first length may be required to detect a first swipe, while a second length that is shorter than the first length may be required to detect a repeat swipe. In some embodiments, the first condition comprises an engagement gesture, for example the maintenance of a hand pose for a threshold amount of time, and the system detects a gesture, for example a swipe, after the first condition is satisfied. In some such embodiments, a requirement for the engagement gesture may be bypassed if the system detects another swipe gesture thereafter. Thus, in systems where an engagement gesture is required before performing a further gesture—in such systems, the first and second conditions may comprise the engagement gesture—a repetitive gesture may be detected even in the absence of the engagement gesture in some embodiments.

Figure 2:
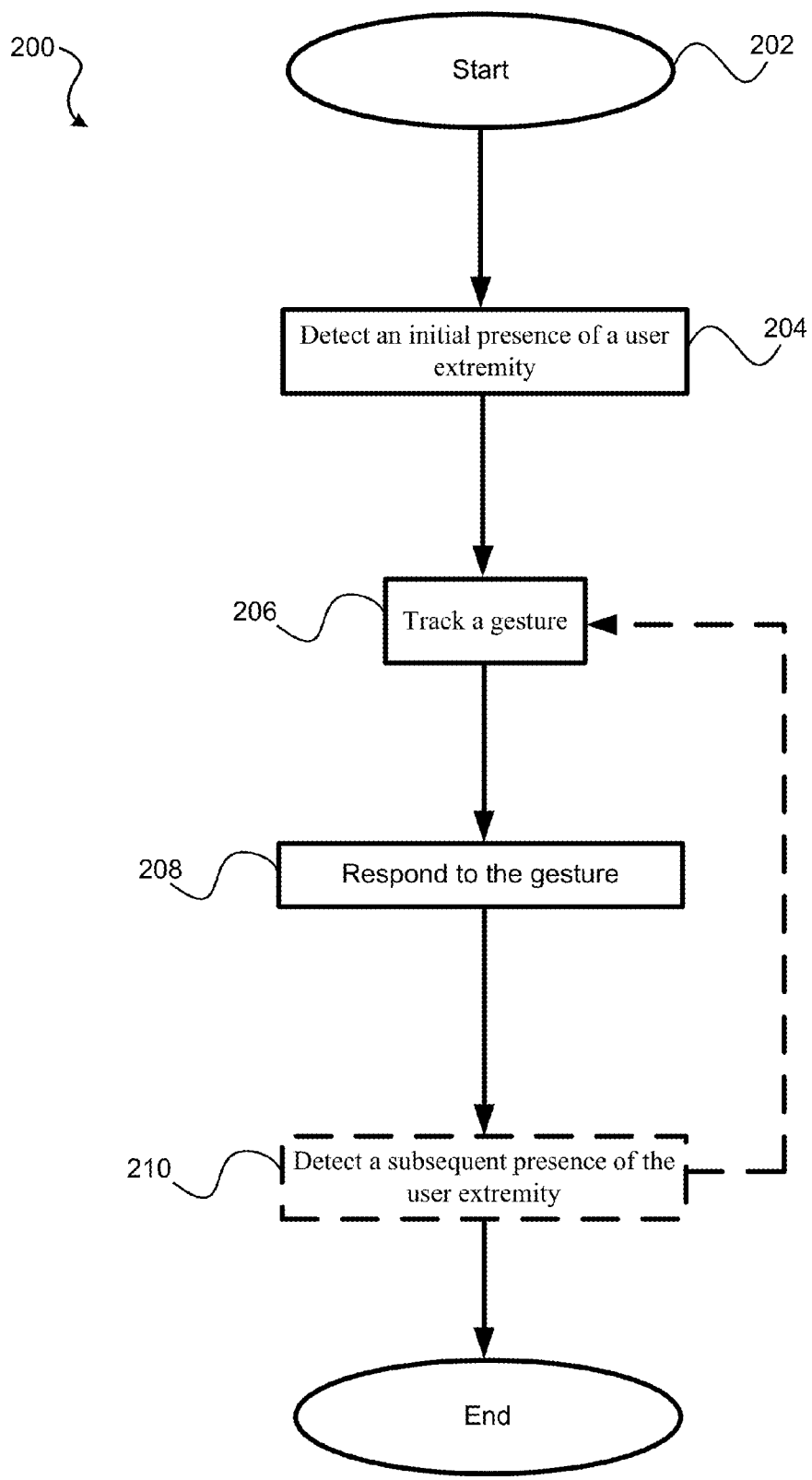
FIG. 2 is a flow diagram illustrating an exemplary embodiment of the invention for tracking and responding to a gesture according to embodiments of the present invention.

FIG. 2 is a flow diagram 200 illustrating an exemplary embodiment of the invention for tracking and responding to a gesture according to embodiments of the present invention. The method is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

At block 202, the computer system starts monitoring for gestures. At block 204, the computer system detects an initial presence of a user extremity in a position, region, location or area for a first pre-defined period of time, for example using the camera 1420 and/or input device 1408. Detecting an initial presence of a user extremity in a region for a first pre-defined period of time engages the gesture mode for the purposes of tracking the gesture. In some embodiments, the computer system may be configured to detect the user extremity in a pre-defined region. The user extremity may be a hand. In some implementations, detecting the initial presence of a user extremity comprises detecting a hand-pose in the region. Furthermore, detecting the initial presence of the user extremity may comprise detecting that the user's extremity is steady in the region. In one implementation, detecting that the user extremity is steady may involve detecting a movement associated with the user extremity that is below a pre-defined threshold in the region for the first pre-defined period of time. Although any suitable means may be used, in one implementation, the method performed by the computer system may use the Viola-Jones object detection framework for detecting the presence of the user extremity.

The computer system may further provide feedback to the user that the system is engaged in gesture mode and is ready for tracking gestures, for example using output device 1410. The feedback may be one or more of visual, audio or tactical feedback.

At block 206, the method performed by the computer system tracks a gesture by the user extremity starting from the region of the detection of the initial presence of the user extremity. The user extremity may be the user's hand. Tracking a gesture may comprise first detecting the gesture and then tracking the gesture over a period of time. The gesture may be detected using a Viola-Jones object detection framework or any other suitable means. In one implementation, tracking the gesture comprises obtaining a plurality of images including the user extremity, using an image sensor communicatively coupled to the computing device, and determining a movement of the user extremity in a particular direction by analyzing the change in the attributes associated with the user extremity in the plurality of images. Cameras 1420 (see FIG. 14) and other input devices 1408 described in FIG. 14 may be employed in sensing the user extremity. The method performed by the computer system may use an optical flow framework or a histogram framework using a plurality of two-dimensional images, an ultrasound sensor tracking or a depth sensor tracking for tracking a gesture, as described above, or any other suitable means.

At block 208, the method performed by the computer system responds to the tracking of the gesture. In one example, the user may use a gesture to flip pages or move objects displayed on the display unit or as holographic or 3D images. This gesture may affect the application 1416 or other elements of device 1400. In one instance, the response to the user's gestures is visible on a display device such as an output device 1410 described in FIG. 14.

At block 210, the method performed by the computer system re-engages the gesture mode for tracking successive gestures upon detecting a subsequent presence of the user extremity. One advantage of re-engaging the tracking system for rapid successive gestures is that it allows the computer system to respond faster to the user's gestures such as flipping pages through a book instead of requiring the user to engage the system from block 204 for the repetitive gestures, which otherwise may take a longer setup time.

At block 210, the method performed by the computer system detects a subsequent presence of the user extremity in the region for a second pre-defined period of time and re-engages the gesture mode. In some implementations, the second pre-defined period of time is shorter than the first pre-defined period of time. The region for user extremity detection for re-engagement may be larger than the region for initial engagement. This is an example of the second condition being less stringent than the first condition. In yet other implementations, a second pre-defined period may not be needed and may be zero or negligible.

The computer system may be configured to detect the user extremity in the same region that the user extremity was initially detected, at block 204. The computer system may also take into account deviations in the region over time. The user extremity may be a hand. In some implementations, detecting the initial presence of a user extremity comprises detecting a hand-pose in the region. Furthermore, detecting the initial presence of the user extremity may comprise detecting that the user's extremity is steady in the region. In one implementation, detecting that the user extremity is steady may involve detecting a movement associated with the user extremity that is below a pre-defined threshold in the region for the first pre-defined period of time. Although any suitable means may be used, in one implementation, the method performed by the computer system may use the Viola-Jones object detection framework for detecting the presence of the user extremity.

The computer system may further provide feedback to the user that the system is re-engaged in gesture mode and is ready for tracking gestures, for example using output device 1410. The feedback may be one or more of visual, audio or tactical feedback. Feedback may be provided to the user using output devices 1410 described in FIG. 14. Once the gesture mode is re-engaged, the method performed by the computer system may start tracking the gesture by the user extremity from the region (block 206) and responding to tracking of the gesture (block 208).

If the computer system does not detect a subsequent presence of the user extremity in block 210, for example within a threshold period of time, the method may end and gesture tracking may no longer continue. A user may then be required to fully re-engage the computer system prior to performing any subsequent gesture commands.

Figure 3:
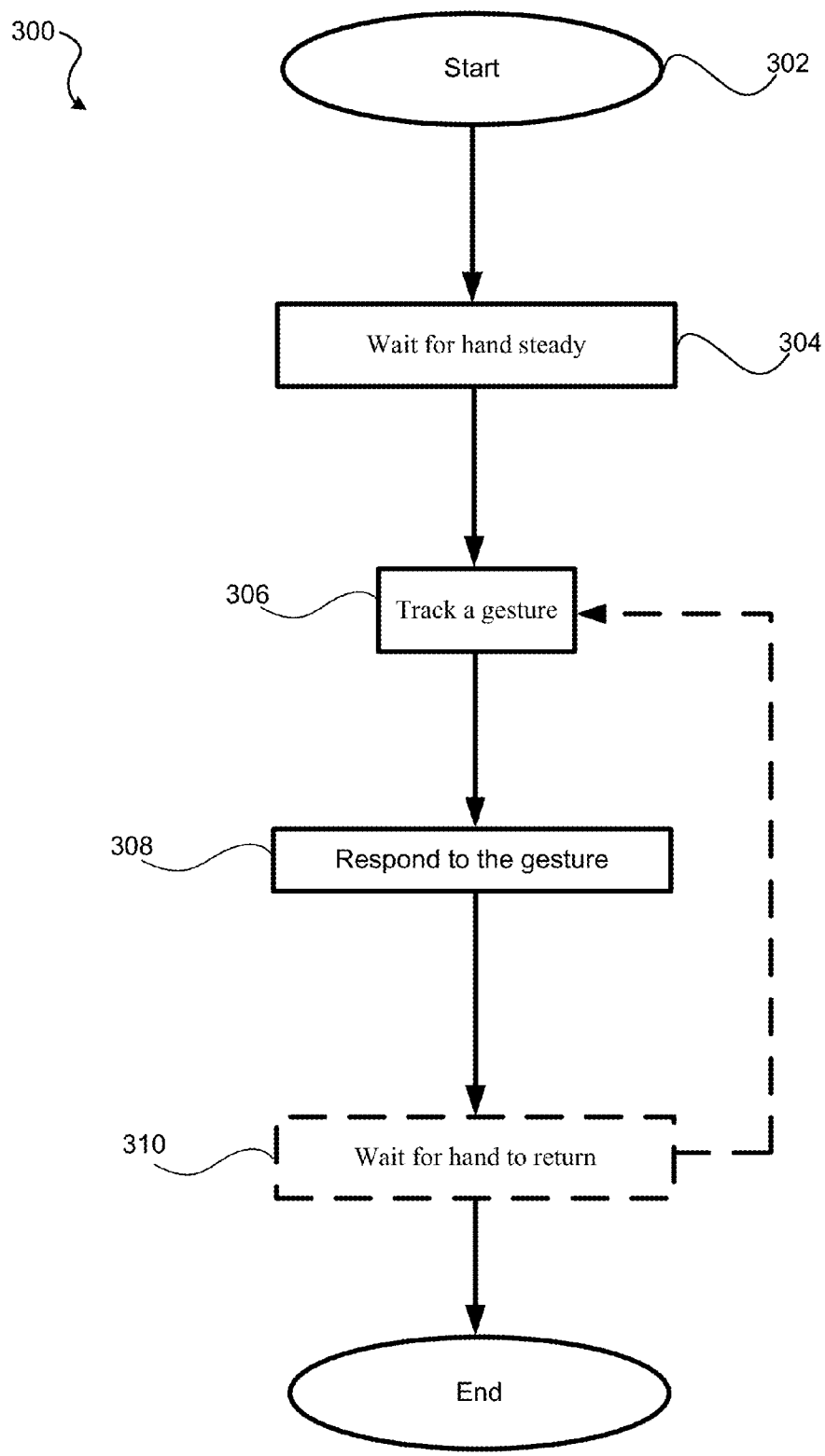
FIG. 3 is a flow diagram illustrating an exemplary embodiment of the invention for detecting a steady user extremity according to embodiments of the present invention.

FIG. 3 is a flow diagram 300 illustrating an exemplary embodiment of the invention for detecting a steady user extremity according to embodiments of the present invention. The method 300 is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

At block 302, the computer system starts monitoring for a user's hand. At block 304, the method performed by the computer system waits and determines if a user's hand is steady and is at a location for a pre-defined period of time. A location may be an area visible by an image capture device, for example, camera 1420. The location may also be a pre-defined radius around an initial point of detection of the user's hand. In some embodiments, the location may be defined by a box or rectangle around the initial point of detection of the user's hand. The initial point of detection of the user's hand may be defined using (x,y) coordinates. At block 306, the method performed by the computer system tracks a gesture starting from the location where the user's hand is detected, for example using the camera 1420 and/or input device 1408. At block 308, the method performed by the computer system responds to the gesture. The response to the gesture may be externally visible, such as a representation of flipping virtual book pages or may be an internal trigger for performing a task by the computer system. At block 310, the method performed by the computer system waits for the user's hand to return to the location where the user's hand was originally detected. As described above, the location may be a predefined radius or box/rectangle around the initial point of detection of the user's hand. In some embodiments, the location may be relative to the user's body, e.g., back to the user's right side after performing a left swipe, even if the absolute position may have changed with respect to the camera 1420. In some embodiments, the location may be within a threshold distance of the absolute original position (the initial point of detection), or within a penumbra of an original radius, box, rectangle, region, etc. If the user's hand returns, the tracking system for the gesture is re-engaged and the system continues to track the gesture (block 306). It can be appreciated that block 304 may be bypassed upon the system continuing to track the gesture (block 306).

Embodiments of the invention described above may be performed by obtaining a plurality of subsequent images of the user's hand using an image sensor communicatively coupled to the computer system. One or more cameras 1420 and other input devices 1408 described in FIG. 14 may be employed in sensing the images. At block 302, the system continues to analyze obtained images for detection of a user's hand. At block 304, the computer system detects that the user' hand is steady and is at a location for a pre-defined period of time by analyzing the plurality of images, for example captured using the camera 1420 and/or input device 1408. At block 306, the computer system detects and tracks the gesture starting at the location by analyzing subsequent images. At block 308, the computer system responds to the detected gesture. At block 310, the computer system waits and detects the user's hand returning to the location by analyzing subsequent images. If the user's hand is detected, the computer system tracks (at block 306) and responds (at block 308) to the gesture starting at the original location by analyzing subsequent images.

If the computer system does not detect a return of the hand after a predetermined period of time in block 310, for example within a threshold period of time, the method may end and gesture tracking may no longer continue. A user may then be required to fully re-engage the computer system prior to performing any subsequent gesture commands.

Figure 4:
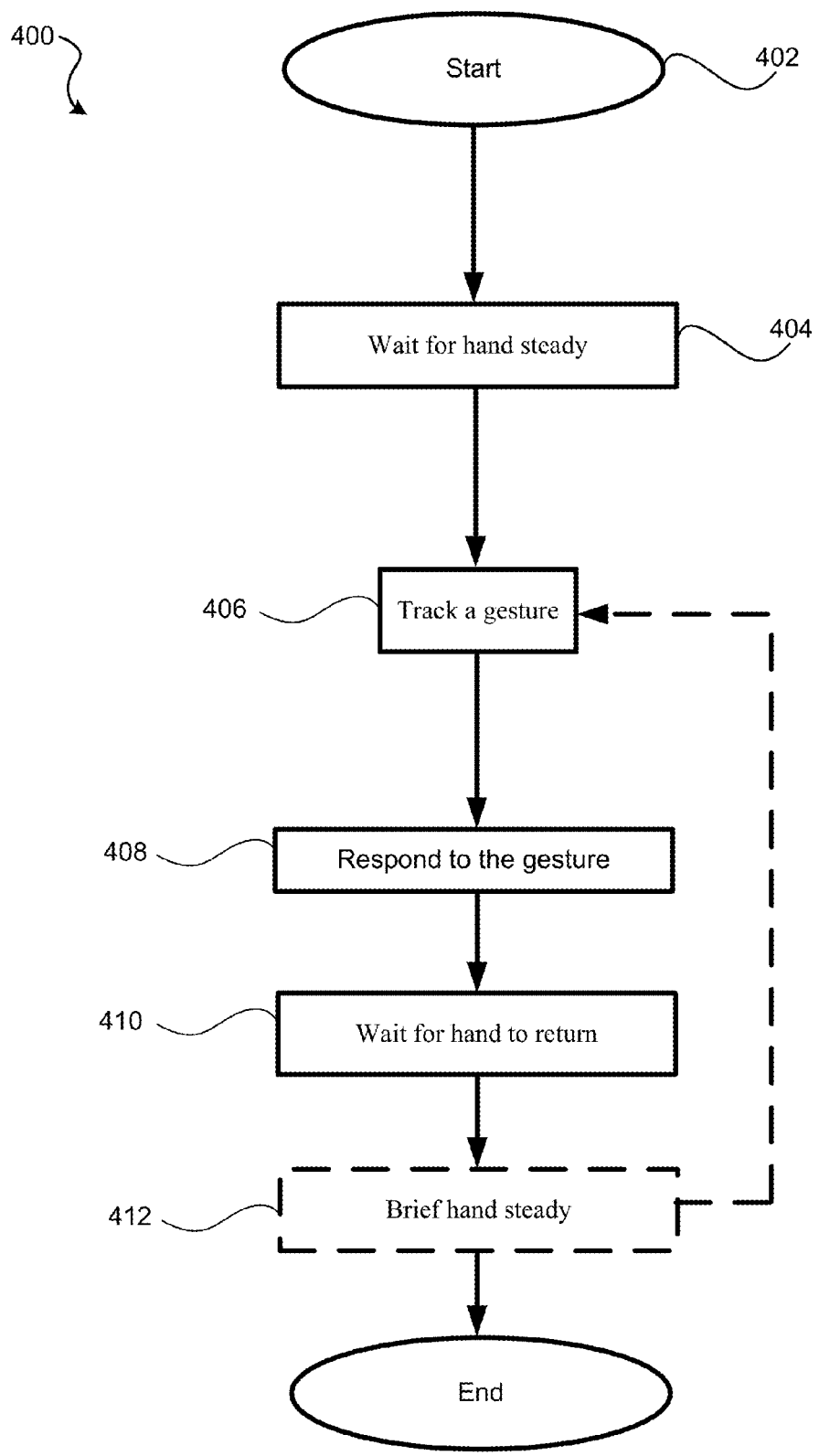
FIG. 4 is a flow diagram illustrating an exemplary embodiment of the invention for tracking a successive gesture upon detecting a steady user extremity according to embodiments of the present invention.

FIG. 4 is a flow diagram 400 illustrating an exemplary embodiment of the invention for tracking a successive gesture upon detecting a steady user extremity according to embodiments of the present invention. The method 400 is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

At block 402, the computer system starts monitoring for a user's hand. At block 404, the method performed by the computer system waits and determines if a user's hand is steady and is at a location for a first pre-defined period of time. At block 406, the method performed by the computer system tracks a gesture starting from the location where the user's hand is detected, for example using the camera 1420 and/or input device 1408. At block 408, the method performed by the computer system responds to the gesture. The response to the gesture may be externally visible, such as a representation of flipping virtual book pages or may be an internal trigger for performing a task by the computer system. At block 410, the method performed by the computer system waits for the user's hand to return to the location where the user's hand was originally detected. If the user's hand returns to the original location, at block 412, the computer system waits for an additional second pre-defined period of time to detect steadiness in the user's hand, wherein the second pre-defined period of time is shorter than the first pre-defined period of time before the tracking system for the gesture is re-engaged and the system continues to track the gesture again (block 406). This is an example of the second condition being less stringent than the first condition.

Embodiments of the invention described above may be performed by obtaining a plurality of subsequent images of the user's hand using an image sensor communicatively coupled to the computer system. One or more cameras 1420 (see FIG. 14) and other input devices 1408 described in FIG. 14 may be employed in sensing the images. At block 402, the system starts analyzing obtained images for detection of a user's hand. At block 404, the computer system detects that the user's hand is steady and is at a location for a first pre-defined period of time by analyzing the plurality of images. At block 406, the computer system detects and tracks the gesture starting at the location by analyzing subsequent images. At block 408, the computer system responds to the detected gesture. At block 410, the computer system waits and detects the user's hand returning to the location by analyzing subsequent images. If the user's hand is detected, the computer system waits further for an additional second pre-defined period of time to ensure steadiness of the user's hand, at block 412, before tracking (at block 406) and responding (at block 408) to the gesture starting at the original location by analyzing subsequent images. It can be appreciated that block 304 may be bypassed upon the system continuing to track the gesture (block 306).

If the computer system does not detect steadiness of the user's hand in block 412, for example within a threshold period of time, the method may end and gesture tracking may no longer continue. A user may then be required to fully re-engage the computer system prior to performing any subsequent gesture commands.

Figure 5:
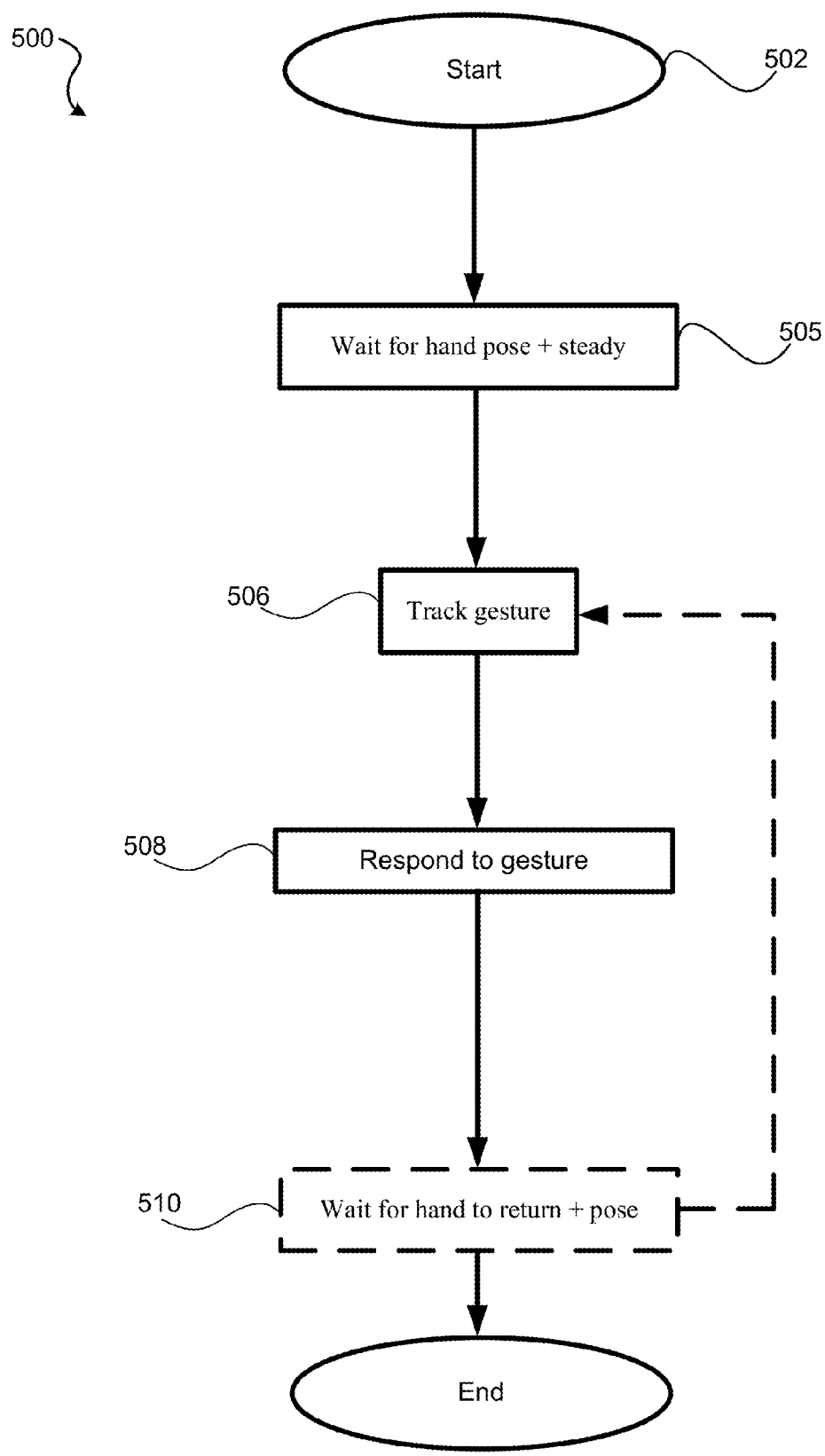
FIG. 5 is a flow diagram illustrating an exemplary embodiment of the invention for tracking a successive gesture upon detecting a return of a user extremity within a region according to embodiments of the present invention.

FIG. 5 is a flow diagram 500 illustrating an exemplary embodiment of the invention for tracking a successive gesture upon detecting a return of a user extremity within a region according to embodiments of the present invention. The method 500 is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

Embodiments of the invention described herein may be performed by obtaining a plurality of subsequent images of the user's hand using an image sensor communicatively coupled to the computer system. One or more cameras 1420 (see FIG. 14) and other input devices 1408 described in FIG. 14 may be employed in sensing the images. At block 502, the system continues to analyze obtained images for detection of a user's hand, for example using the camera 1420 and/or input device 1408. At block 504, the computer system detects a hand pose and that the user's hand is steady in the hand pose at a location for a pre-defined period of time by analyzing the plurality of images. At block 506, the computer system detects and tracks the gesture starting at the location by analyzing subsequent images. At block 508, the computer system responds to the detected gesture. At block 510, the computer system waits and detects that the user's hand returning to the location and the hand-pose by the user by analyzing subsequent images. If the return of the user's hand and the hand-pose are detected, the computer system tracks (at block 506) and responds (at block 508) to the gesture starting at the original location by analyzing subsequent images. It can be appreciated that block 505 may be bypassed upon the system continuing to track the gesture (block 506).

If the computer system does not detect the user's hand returning the location and the hand-pose by the user in block 510, for example within a threshold period of time, the method may end and gesture tracking may no longer continue. A user may then be required to fully re-engage the computer system prior to performing any subsequent gesture commands.

Figure 6:
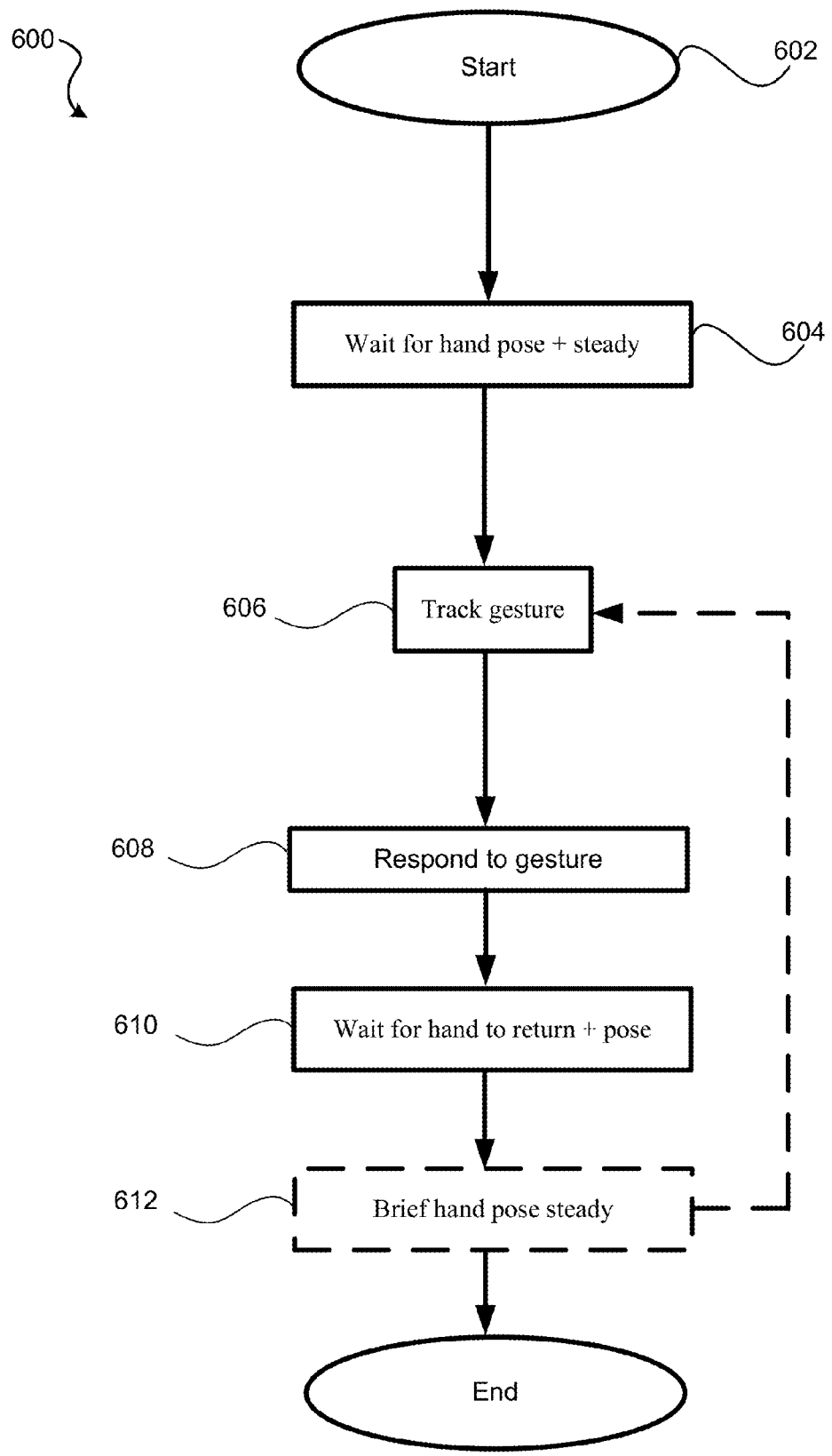
FIG. 6 is a flow diagram illustrating an exemplary embodiment of the invention for tracking a successive gesture upon detecting a return of a steady user extremity within a region according to embodiments of the present invention.

FIG. 6 is a flow diagram 600 illustrating an exemplary embodiment of the invention for tracking a successive gesture upon detecting a return of a steady user extremity within a region according to embodiments of the present invention. The method is performed by processing logic, such as processor 1404 that comprises hardware (circuitry, dedicated logic, etc.), software (such as is run on a general purpose computing system or a dedicated machine), firmware (embedded software), or any combination thereof. In one embodiment, the method 600 is performed by device 1400 of FIG. 14. The software running on the computer system may comprise an operating system 1414 and applications 1416, stored in working memory 1418 or on storage device 1406.

Embodiments of the invention described herein may be performed by obtaining a plurality of subsequent images of the user's hand using an image sensor communicatively coupled to the computer system. One or more cameras 1420 and other input devices 1408 described in FIG. 14 may be employed in sensing the images. At block 602, the system starts analyzing obtained images for detection of a user's hand, for example using the camera 1420 and/or input device 1408. At block 604, the computer system detects a hand-pose and that the user' hand is steady at a location for a first pre-defined period of time by analyzing the plurality of images. At block 606, the computer system detects and tracks the gesture starting at the location by analyzing subsequent images. At block 608, the computer system responds to the detected gesture. At block 610, the computer system waits and detects the user's hand returning to the location and the hand-pose by analyzing subsequent images. If the user's hand and the hand-pose are detected, the computer system waits further for an additional second pre-defined period of time to ensure steadiness of the hand-pose, at block 612, before tracking (at block 606) and responding (at block 608) to the gesture starting at the original location by analyzing subsequent images. The second pre-determined period of time may be shorter than the first pre-determined period of time. This is an example of the second condition being less stringent than the first condition. It can be appreciated that block 604 may be bypassed upon the system continuing to track the gesture (block 606).

If the computer system does not detect steadiness of the hand-pose in block 612, for example within a threshold period of time, the method may end and gesture tracking may no longer continue. A user may then be required to fully re-engage the computer system prior to performing any subsequent gesture commands.

Figure 7:
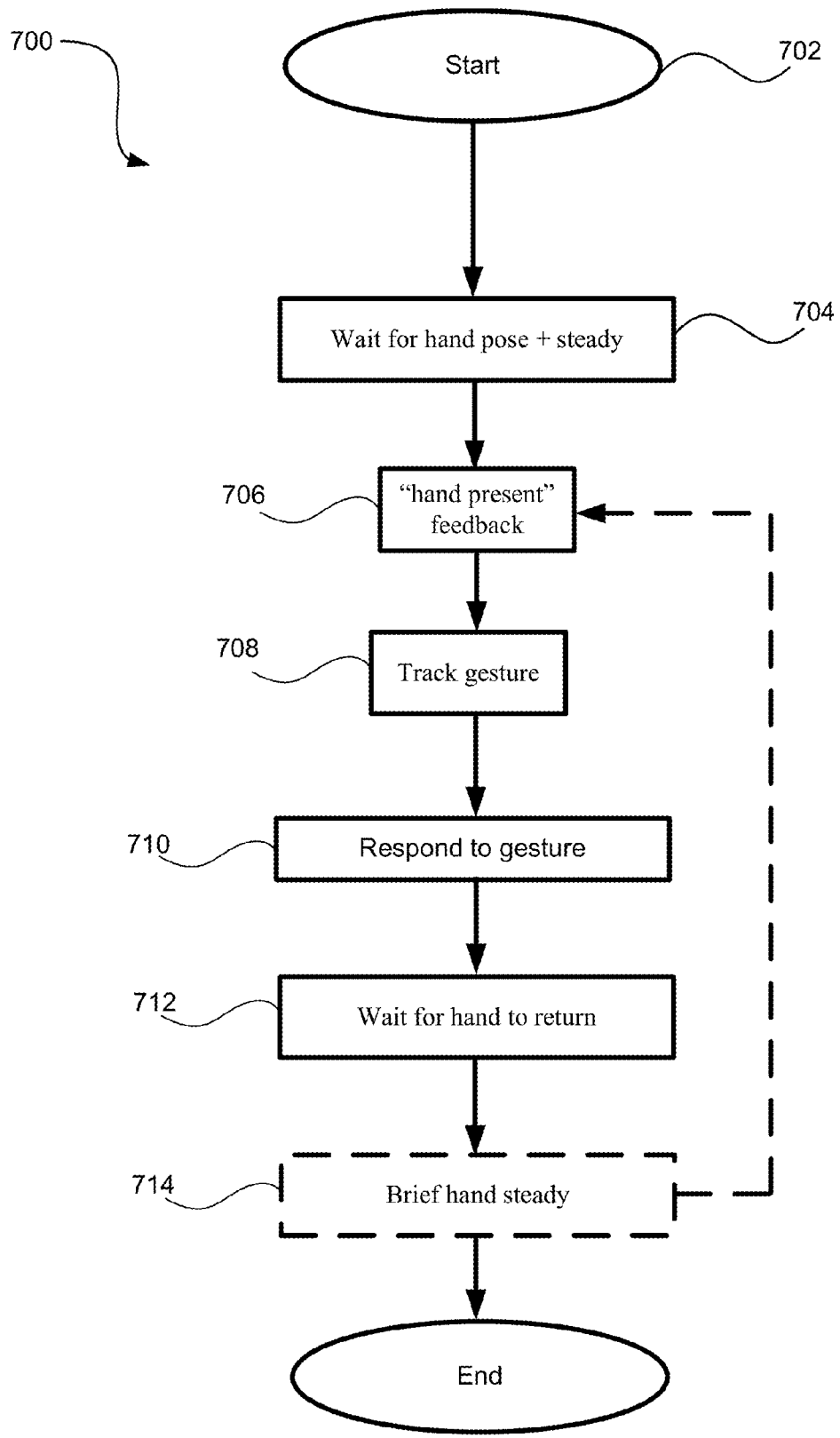
FIG. 7 is a flow diagram illustrating an exemplary embodiment of the invention for tracking a successive gesture upon detecting a steady user extremity and providing feedback to the user according to embodiments of the present invention.

FIG. 7 is a flow diagram 700 illustrating an exemplary embodiment of the invention for tracking a successive gesture upon detecting a steady user extremity and providing feedback to the user according to embodiments of the present invention. The method is performed by processing logic, such as processor 1404 that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

At block 702, the computer system starts monitoring for a user's hand. At block 704, the method performed by the computer system waits and determines if a user's hand is steady and is at a location for a pre-defined period of time. At block 706, the method performed by the computer system may provide feedback to the user that the system is engaged, for example using output device 1410, in response to determining that the user's hand is steady and is at a location for a pre-defined period of time. At block 708, the method performed by the computer system tracks a gesture starting from the location where the user's hand is detected. At block 710, the method performed by the computer system responds to the gesture. The response to the gesture may be externally visible such as a representation of flipping virtual book pages or may be an internal trigger for performing a task by the computer system. At block 712, the method performed by the computer system waits for the user's hand to return to the location where the user's hand was originally detected. At block 714, the computer system may wait for a second pre-defined period of time to determine that the hand is in a steady hand-pose. If the user's hand returns, the hand-pose is detected and the hand is steady, the tracking system for the gesture is re-engaged and the system continues to track the gesture (block 708). Optionally, the computer system may provide additional feedback that the system is re-engaged for tracking again (block 706). It can be appreciated that block 704 may be bypassed upon the system continuing to track the gesture (block 706).

If the computer system does not detect a steady hand-pose in block 714, for example within a threshold period of time, the method may end and gesture tracking may no longer continue. A user may then be required to fully re-engage the computer system prior to performing any subsequent gesture commands.

Figure 8:
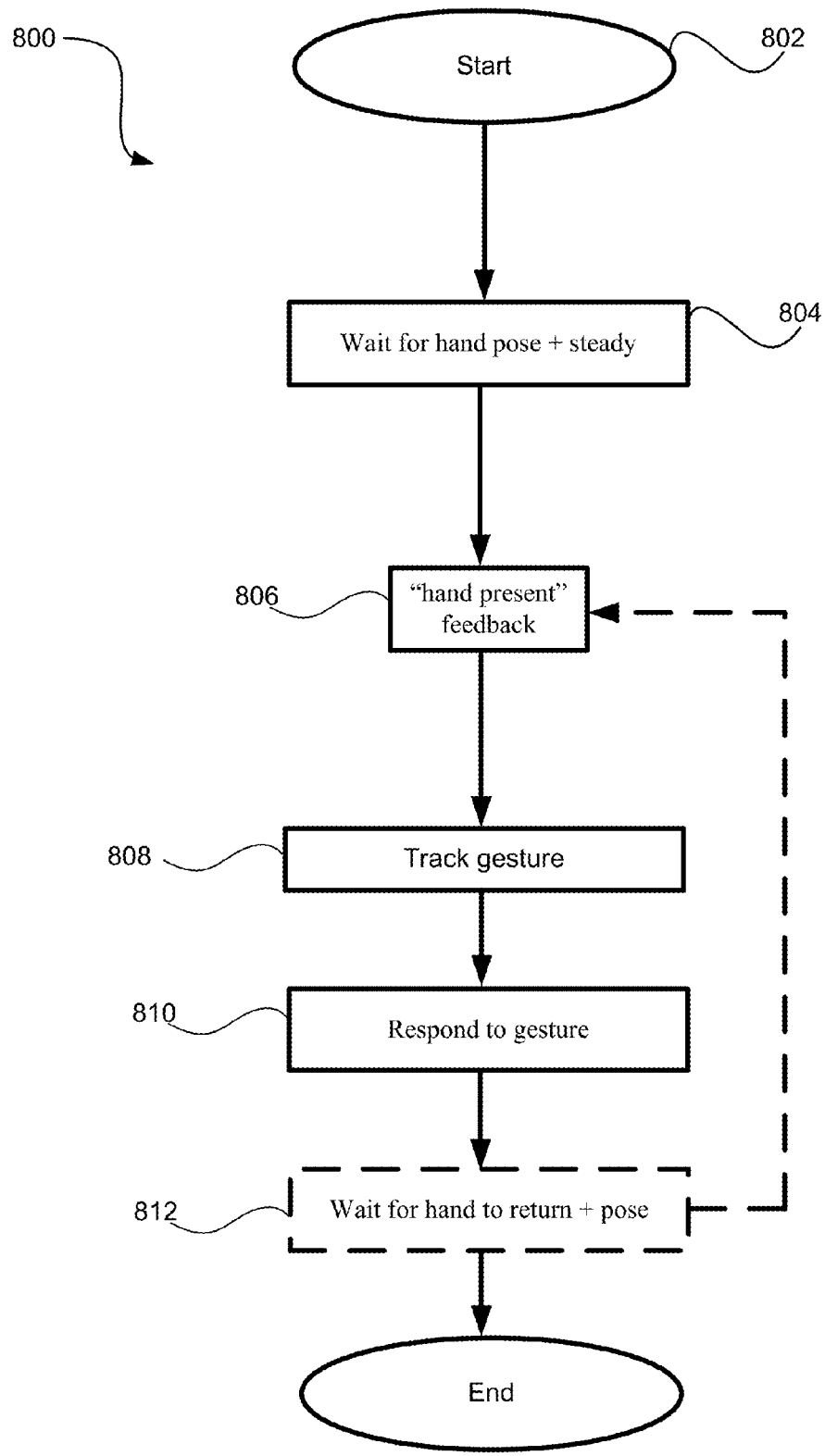
FIG. 8 is a flow diagram illustrating an exemplary embodiment of the invention for tracking a successive gesture upon detecting a return of a user extremity within a region and providing feedback to the user according to embodiments of the present invention.

FIG. 8 is a flow diagram 800 illustrating an exemplary embodiment of the invention for tracking a successive gesture upon detecting a return of a user extremity within a region and providing feedback to the user according to embodiments of the present invention. The method is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

Embodiments of the invention described herein may be performed by obtaining a plurality of subsequent images of the user's hand using an image sensor communicatively coupled to the computer system. One or more cameras 1420 and other input devices 1408 described in FIG. 14 may be employed in sensing the images. At block 802, the system continues to analyze obtained images for detection of a user's hand. At block 804, the computer system detects a hand pose and that the user' hand is steady in the hand pose at a location for a pre-defined period of time by analyzing the plurality of images. At block 806, the method performed by the computer system may provide feedback to the user that the system is engaged, for example using output device 1410. At block 808, the computer system detects and tracks the gesture starting at the location by analyzing subsequent images. At block 810, the computer system responds to the detected gesture. At block 812, the computer system waits and detects that the user's hand is returning to the location and the hand-pose by the user by analyzing subsequent images. At block 806, the computer system may provide additional feedback that the system is re-engaged for tracking again. If the return of the user's hand and the hand-pose are detected, the computer system tracks (at block 808) and responds (at block 810) to the gesture starting at the original location by analyzing subsequent images. It can be appreciated that block 804 may be bypassed upon the system continuing to track the gesture (block 806).

If the computer system does not detect the user's hand returning the location and the hand-pose in block 812, the method may end and gesture tracking may no longer continue. A user may then be required to fully re-engage the computer system prior to performing any subsequent gesture commands.

Figure 9:
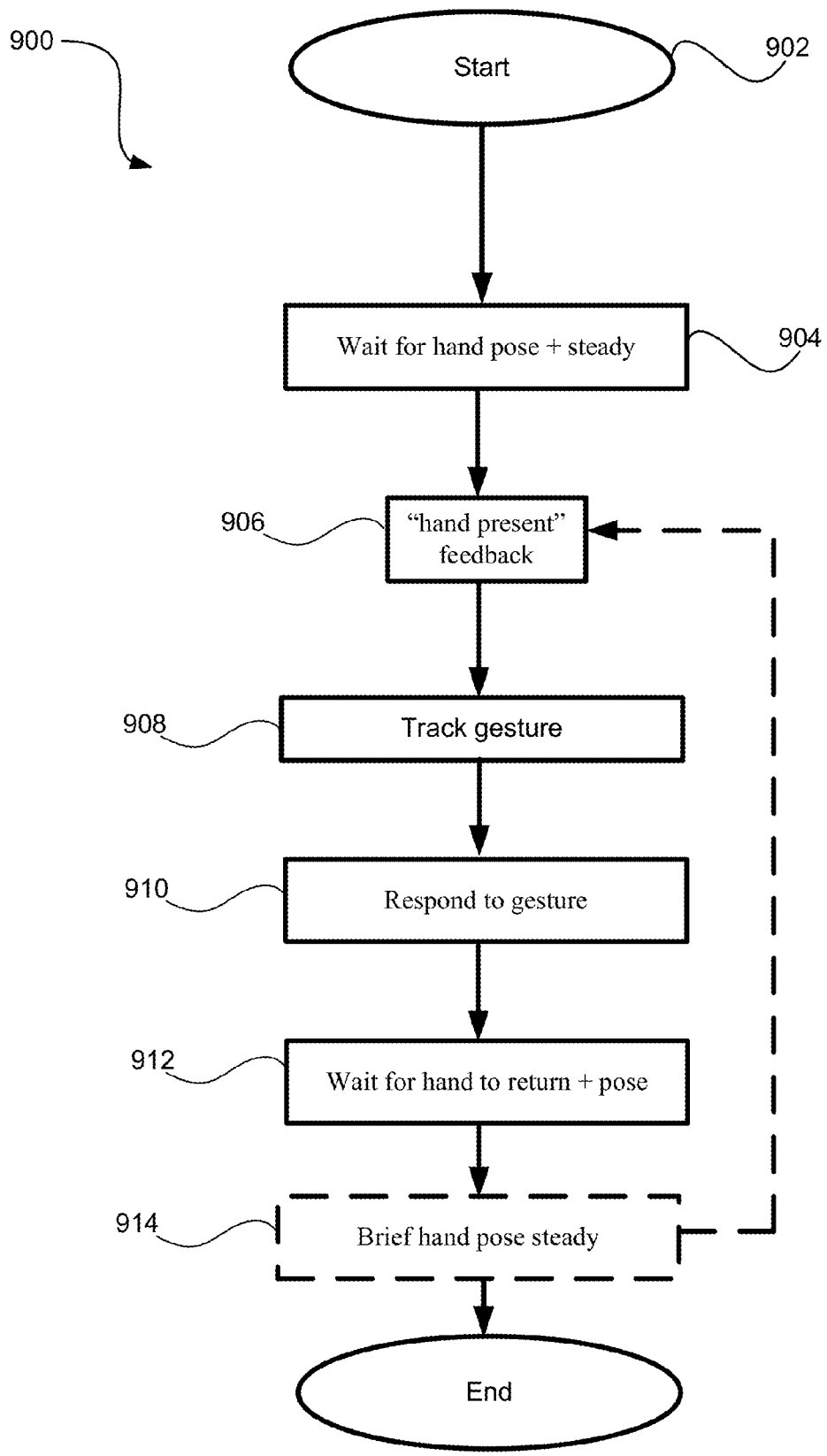
FIG. 9 is a flow diagram illustrating an exemplary embodiment of the invention for tracking a successive gesture upon detecting a return of a steady user extremity within a region and providing feedback to the user according to embodiments of the present invention.

FIG. 9 is a flow diagram 900 illustrating an exemplary embodiment of the invention for tracking a successive gesture upon detecting a return of a steady user extremity within a region and providing feedback to the user according to embodiments of the present invention, for example using output device 1410. The method is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

Embodiments of the invention described herein may be performed by obtaining a plurality of subsequent images of the user's hand using an image sensor communicatively coupled to the computer system. One or more cameras 1420 and other input devices 1408 described in FIG. 14 may be employed in sensing the images. At block 902, the system starts analyzing obtained images for detection of a user's hand, for example images obtained using the camera 1420 and/or input device 1408. At block 904, the computer system detects a hand-pose and that the user' hand is steady at a location for a first pre-defined period of time by analyzing the plurality of images. At block 906, the method performed by the computer system may provide feedback to the user that the system is engaged. At block 908, the computer system detects and tracks the gesture starting at the location by analyzing subsequent images. At block 910, the computer system responds to the detected gesture. At block 912, the computer system waits and detects the user's hand returning to the location and the hand-pose by analyzing subsequent images. If the user's hand and the hand-pose are detected, the computer system waits further for an additional second pre-defined period of time to ensure steadiness of the hand-pose, at block 914, before tracking (at block 908) and responding (at block 910) to the gesture starting at the original location by analyzing subsequent images. The second pre-determined period of time may be shorter than the first pre-determined period of time. This is an example of the second condition being less stringent than the first condition. Before again tracking and responding, at block 906, the computer system may provide feedback to the user that the tracking system is back in gesture mode, for example using output device 1410. It can be appreciated that block 904 may be bypassed upon the system providing feedback to the user (block 906).

If the computer system does not detect steadiness of the hand-pose in block 914, for example within a threshold period of time, the method may end and gesture tracking may no longer continue. A user may then be required to fully re-engage the computer system prior to performing any subsequent gesture commands.

Figure 10:
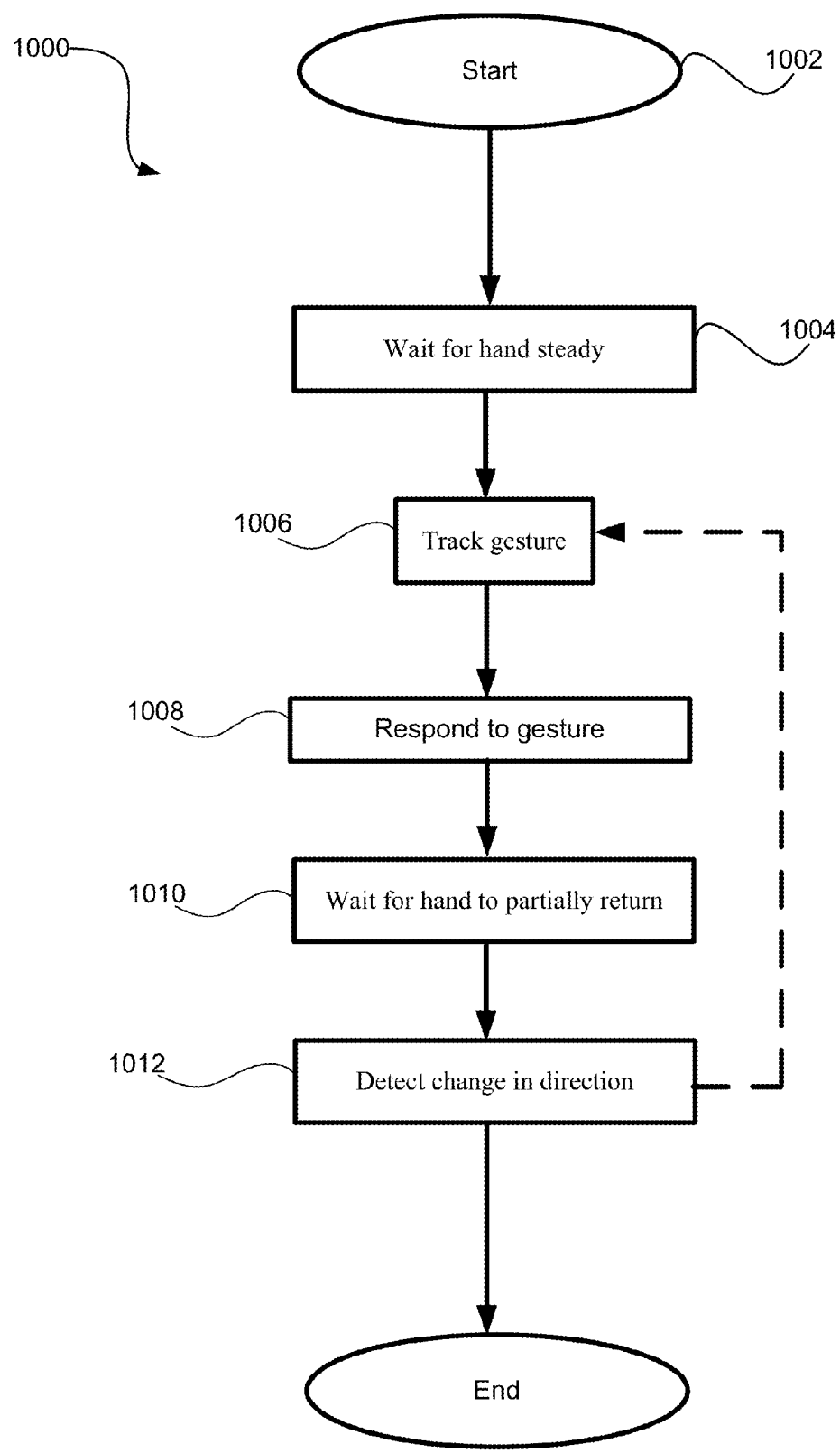
FIG. 10 is a flow diagram illustrating an exemplary embodiment of the invention for tracking successive gestures and detecting a change in direction of the gesture according to embodiments of the present invention.

FIG. 10 is a flow diagram 1000 illustrating an exemplary embodiment of the invention for tracking successive gestures and detecting a change in direction of the gesture according to embodiments of the present invention. The method is performed by processing logic, such as processor 1404 (see FIG. 14) that comprises hardware (circuitry, dedicated logic, etc.), software (such as is run on a general purpose computing system or a dedicated machine), firmware (embedded software), or any combination thereof. In one embodiment, the method is performed by device 1400 of FIG. 14. The software running on the computer system may comprise an operating system 1414 and applications 1416, stored in working memory 1418 or on storage device 1406.

At block 1002, the computer system starts monitoring for a user's hand. At block 1004, the method performed by the computer system waits and determines if a user's hand is steady and is at a location for a pre-defined period of time. At block 1006, the method performed by the computer system tracks a gesture starting from the location where the user's hand is detected. At block 1008, the method performed by the computer system responds to the gesture. The response to the gesture may be an externally visible such as a representation of flipping book pages or may be an internal trigger for performing a task by the computer system. At block 1010, the method performed by the computer system waits for at least a partial return of the user's hand to the location where the user's hand was originally detected. At block 1012, the computer system detects a change in direction away from the initial location without the hand reaching the initial location. In one embodiment, the computer system detects this partial return of the user's hand, as intent by the user to re-engage the gesture mode. Therefore, the computer system re-engages the gesture mode and starts tracking at block 1006 again. Thus, the gesture mode may be reengaged even when the user does not fully return to the starting position based on a change in direction of a control object.

In an alternative embodiment, after block 1006, a hand may be lost when a gesture tracker cannot track a hand for the entirety of a gesture's motion path. For example, a hand motion may leave the field of view of a sensor, or a hand pose and orientation may change significantly in appearance to the sensor, causing a hand tracker to no longer be capable of tracking a hand's location. A partial motion path may be classified as a gesture if a portion of a gesture is observed immediately prior to the hand being lost. At block 1008, the method performed by the computer system responds to the gesture. The response to the gesture may be externally visible such as a representation of flipping book pages or may be an internal trigger for performing a task by the computer system. At block 1010, the method performed by the computer system waits for a tracker to re-detect a hand within a pre-defined period of time since the hand was most recently lost. In one embodiment, the computer system determines that this re-detection of the user's hand is an intent by the user to re-engage the gesture mode. For example, re-detecting a hand may require that a hand return to the field of view of a sensor, or a hand pose and orientation return to a pose and orientation similar to the original pose and orientation, which may imply an intent by the user to re-engage the gesture mode. Therefore, the computer system re-engages the gesture mode and starts tracking at block 1006 again. It can be appreciated that block 1004 may be bypassed upon the system continuing to track the gesture (block 1006).

Embodiments of the invention described above may be performed by obtaining a plurality of subsequent images of the user's hand using an image sensor communicatively coupled to the computer system. One or more cameras 1420 and other input devices 1408 described in FIG. 14 may be employed in sensing the images. At block 1002, the system continues to analyze obtained images for detection of a user's hand. At block 1004, the computer system detects that the user' hand is steady and is at a location for a pre-defined period of time by analyzing the plurality of images. At block 1006, the computer system detects and tracks the gesture starting at the location by analyzing subsequent images. At block 1008, the computer system responds to the detected gesture. At block 1010, the computer system waits and detects the user's hand partially returning to the location by analyzing subsequent images. At block 1012, the computer system detects a change in the direction of the user's hand away from the initial location by analyzing a plurality of images. In one embodiment, the computer system detects this partial return of the user's hand, as an intent by the user to re-engage the gesture mode. Therefore, the computer system re-engages the gesture mode and starts tracking at block 1006 again.

If the computer system does not detect a change in direction in block 1012, for example within a threshold period of time, the method may end and gesture tracking may no longer continue. A user may then be required to fully re-engage the computer system prior to performing any subsequent gesture commands.

Figure 11:
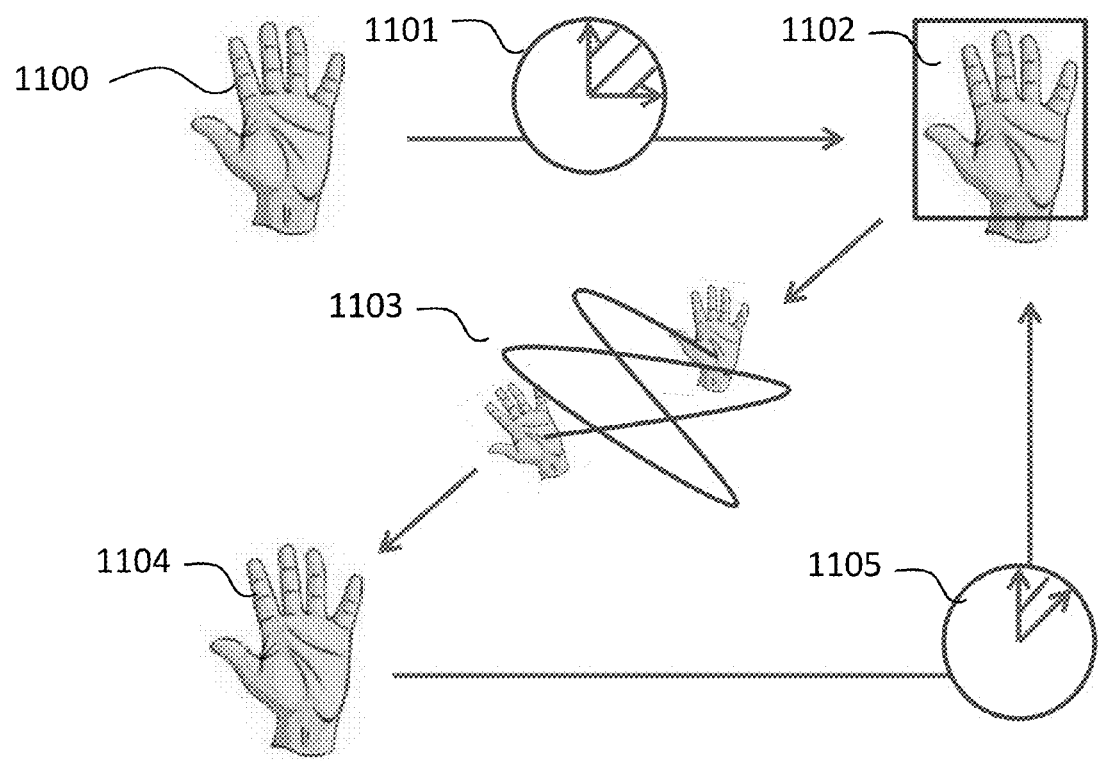
FIG. 11 illustrates entering a gesture mode of operation and reentering a gesture mode of operation according to embodiments of the present invention.

FIG. 11 illustrates entering a gesture mode of operation and reentering a gesture mode of operation according to embodiments of the present invention. A user may perform a user gesture of holding a gesture 1100 (e.g., hand pose) for a first predetermined period of time 1101 to meet the condition(s) of entering a gesture mode of operation 1102, as described above. The user may then perform gestures or poses 1103 and leave the tracking area or otherwise exit the gesture mode of operation, for example by completing a predetermined command. The user may then re-establish the hand pose 1104 and maintain that pose for a second predetermined period of time 1105 that is less than the first period of time and the computer system may enter the gesture mode of operation 1102 once again. When reentering the gesture mode of operation, the computer system need not establish a gesture mode of operation based on the first condition. For example, the computer system does not need to perform the full process of realizing the user wants to perform a gesture because the user has already invoked the gesture mode of operation. The computer may simply recognize the gesture or pose for a second predetermined period of time less than the first predetermined period of time and reenter the gesture mode of operation. That is to say, full detection and/or a full gesture engagement does not need to be completed because it was completed prior.

Figure 12A:
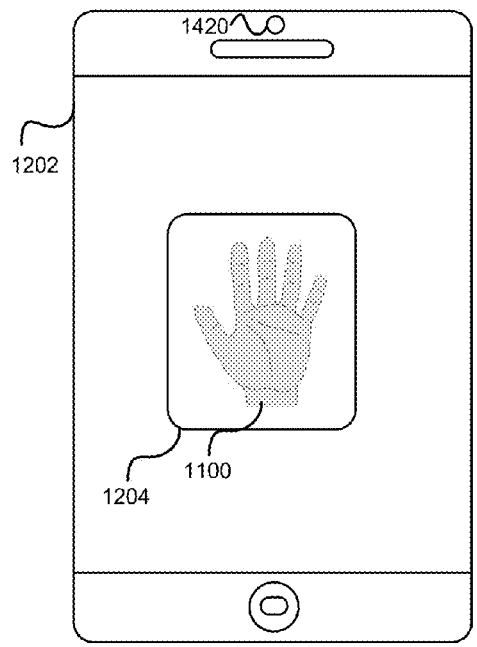
FIGS. 12A-12C illustrate entering a gesture mode of operation and reentering a gesture mode of operation according to embodiments of the present invention.
Figure 12B:
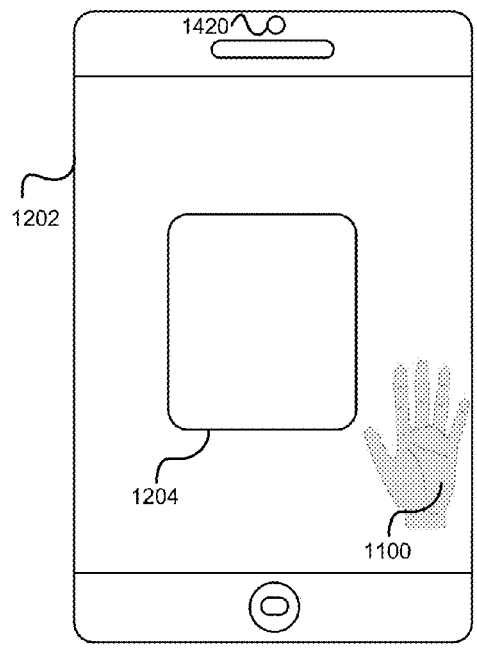
Figure 12C:
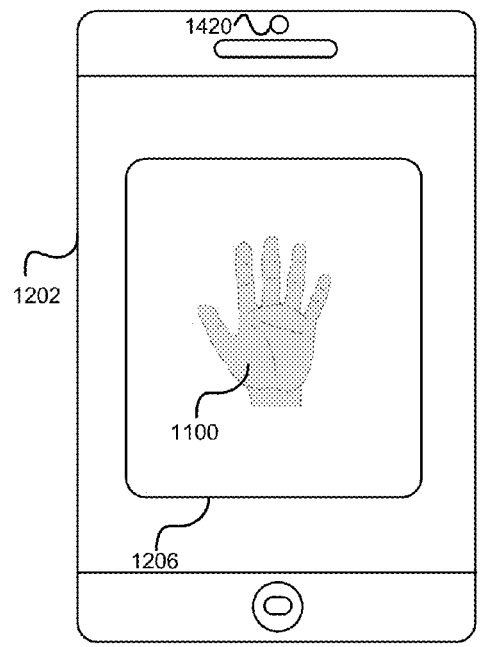

FIGS. 12A-12C illustrate entering a gesture mode of operation and reentering a gesture mode of operation according to embodiments of the present invention. FIG. 12A shows a mobile device 1202, e.g. a smartphone, capable of detecting, recognizing, and responding to gesture 1100 inputs by a user. The gestures 1100 may be detected and recognized by a camera 1420 and further processing logic internal to the mobile device 1202. A gesture 1100 may be recognized when it is presented within a first region 1204 displayed on the mobile device 1202. In some embodiments, the gesture 1100 may need to be recognized within the first region 1204 for a predetermined period of time. After the predetermined period of time, the mobile device 1202 may enter a gesture tracking mode and/or a command mode. While in the gesture tracking mode, the mobile device 1202 may track gestures 1100 performed by a user. While in the command mode, the mobile device 1202 may execute system commands based on the gestures 1100. It can be appreciated that this example depicts a gesture as utilizing a hand; however, other gestures may be employed such as the ones described above.

FIG. 12B shows the gesture 1100 no longer within the first region 1204. For example, if a user moves their hand outside of the first region for detecting and recognizing gestures, the mobile device 1202 may exit the gesture tracking mode and command mode. The mobile device 1202 may no longer respond to any gestures 1100 unless the mobile device 1202 reenters the gesture tracking mode and command mode.

FIG. 12C shows the gesture 1100 within a second region 1206. In this particular embodiment, the second region 1206 is larger than the first region 1204. Upon detecting the gesture 1100 within the second region 1206, the mobile device 1202 may reenter the gesture tracking mode and the command mode. In some embodiments, the gesture 1100 may need to be recognized within the second region 1206 for a predetermined period of time prior to the mobile device 1202 reentering the gesture tracking mode and the command mode. In some embodiments, the predetermined period of time for reentering the gesture tracking mode and the command mode may be less than the predetermined period of time for entering the gesture tracking mode and the command mode.

Since the mobile device 1202 detected the gesture 1100 for a predetermined period of time and within the first region 1204 in FIG. 12A, the mobile device 1202 may not, after exiting the gesture tracking mode and command mode, require a full detection process to reenter the gesture tracking mode and command mode. In some embodiments, a predefined timeout period may exist defining how long a user may able to reenter the gesture tracking mode prior to having to perform the full detection process again. As such, the second region 1206 may be larger than the first region 1204 because it is more likely that a gesture 1100 within the larger second region 1206 is in fact a gesture 1100 and not an accidental input by a user. Similarly, for the same reason, the predetermined period of time to reenter the gesture tracking mode and command mode may be less than the predetermined period of time to initially enter the gesture tracking mode and command mode.

Figure 13A:
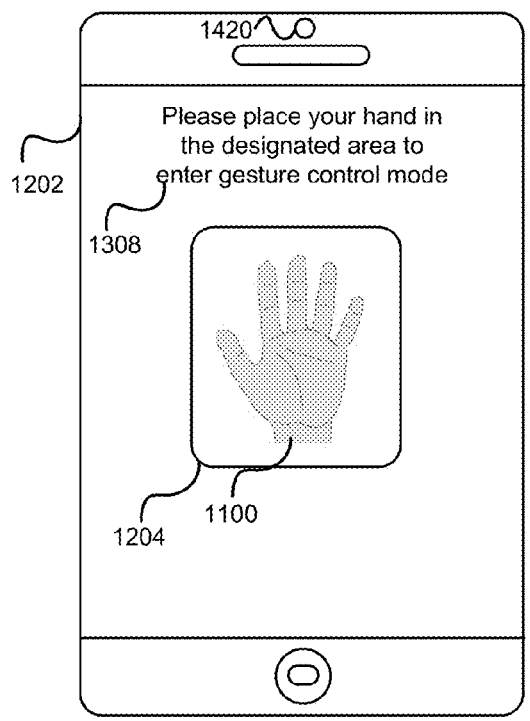
FIGS. 13A-13B illustrate prompts displayed to a user when entering a gesture mode of operation and reentering a gesture mode of operation according to embodiments of the present invention.
Figure 13B:
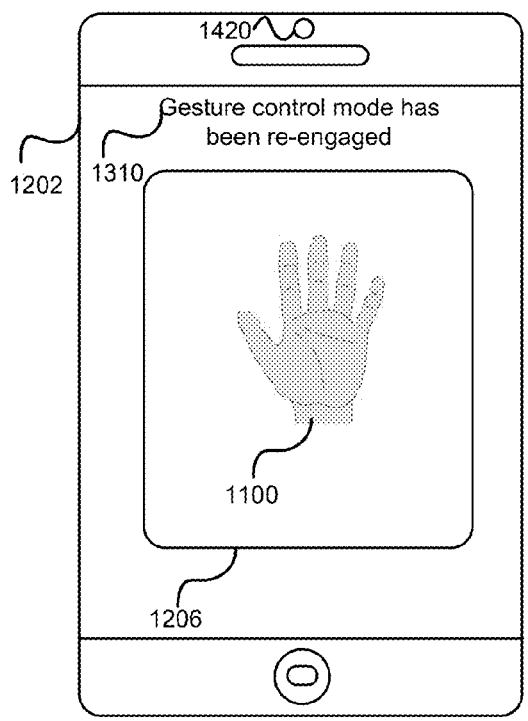

FIGS. 13A-13B illustrate prompts 1308, 1310 displayed to a user when entering a gesture mode of operation and reentering a gesture mode of operation according to embodiments of the present invention. FIG. 13A illustrates a gesture engagement prompt 1308 displayed to a user when entering a gesture tracking mode and/or command mode. As described above, a user may perform a gesture 1100 in a first region 1204 to enter a gesture tracking mode and/or command mode of operation on the mobile device 1202. In some embodiments, a representation of a hand or gesture 1100 may be displayed on a display device, for example output device 1410, to indicate to the user the location that the user is performing the gesture. However, prior to performing the gesture 1100, the mobile device 1202 may display a gesture engagement prompt 1308 to the user indicating that the mobile device 1202 is ready to detect an initial gesture for engagement to enter the gesture mode of operation. For example, the mobile device 1202 may display a gesture engagement prompt 1308 stating "Please place your hand in the designated area to enter a gesture control mode." Once the prompt is displayed, the user may then perform a gesture 1100 in the first region 1204 for a predetermined period of time for the mobile device 1202 to enter the gesture tracking mode and/or command mode. In some embodiments, upon entering the gesture tracking mode and/or command mode the mobile device 1202 may display a prompt stating that the gesture tracking mode and/or command mode has been entered.

FIG. 13B illustrates a gesture reengagement prompt 1310 displayed to a user when reentering a gesture tracking mode and/or command mode. As described above, after initially engaging a gesture mode of operation and/or command mode with the mobile device 1202 and subsequently disengaging the gesture mode of operation and/or command mode, a user may reengage the gesture tracking mode and/or command mode by performing a gesture 1100 in a second region 1206 of the mobile device 1202. After performing the gesture 1100 for reengagement, the mobile device 1202 may display a gesture reengagement prompt 1310 to the user indicating that the mobile device 1202 has reengaged the gesture tracking mode and/or command mode. For example, the mobile device 1202 may display a gesture reengagement prompt 1310 stating "Gesture control mode has been re-engaged."

All of the embodiments described above may be practiced in such systems such as a computer system.

Figure 14:
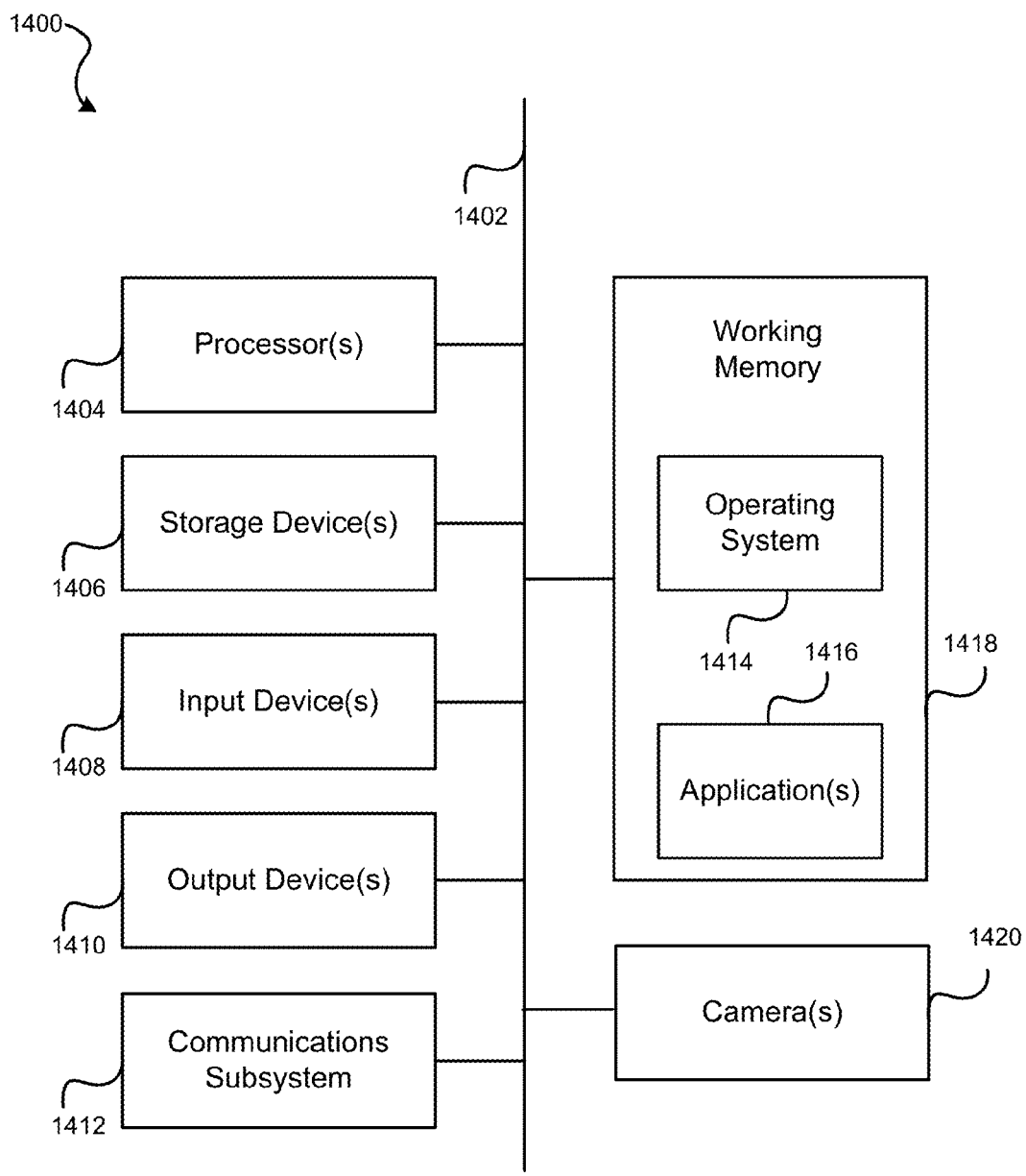
FIG. 14 illustrates an exemplary computer system incorporating parts of the device employed in practicing embodiments of the invention.

FIG. 14 illustrates an exemplary computer system incorporating parts of the device employed in practicing embodiments of the invention according to embodiments of the present invention. A computer system as illustrated in FIG. 14 may be incorporated as part of the above described computerized device. For example, computer system 1400 can represent some of the components of a television, a mobile device, a server, a desktop, a workstation, a control or interaction system in an automobile, a tablet, a netbook or any other suitable computing system. A mobile device may be any computing device with an image capture device or input sensory unit and a user output device. An image capture device or input sensory unit may be a camera device. A user output device may be a display unit. Examples of a mobile device include but are not limited to video game consoles, tablets, smart phones and any other hand-held devices. FIG. 14 provides a schematic illustration of one embodiment of a computer system 1400 that can perform the methods provided by various other embodiments, as described herein, and/or can function as the host computer system, a remote kiosk/terminal, a point-of-sale device, a telephonic or navigation or multimedia interface in an automobile, a mobile device, a set-top box, a table computer and/or a computer system. FIG. 14 is meant only to provide a generalized illustration of various components, any or all of which may be utilized as appropriate. FIG. 14, therefore, broadly illustrates how individual system elements may be implemented in a relatively separated or relatively more integrated manner. In some embodiments, device 1400 may be used to implement mobile device 1202.

The computer system 1400 is shown comprising hardware elements that can be electrically coupled via a bus 1402 (or may otherwise be in communication, as appropriate). The hardware elements may include one or more processors 1404, including without limitation one or more general-purpose processors and/or one or more special-purpose processors (such as digital signal processing chips, graphics acceleration processors, and/or the like); one or more input devices 1408, which can include without limitation one or more cameras, sensors, a mouse, a keyboard, a microphone configured to detect ultrasound or other sounds, and/or the like; and one or more output devices 1410, which can include without limitation a display unit such as the device used in embodiments of the invention, a printer and/or the like. Additional cameras 1420 may be employed for detection of user's extremities and gestures. In some implementations, input devices 1408 may include one or more sensors such as infrared, depth, and/or ultrasound sensors.

In some implementations of the embodiments of the invention, various input devices 1408 and output devices 1410 may be embedded into interfaces such as display devices, tables, floors, walls, and window screens. Furthermore, input devices 1408 and output devices 1410 coupled to the processors may form multi-dimensional tracking systems.

The computer system 1400 may further include (and/or be in communication with) one or more non-transitory storage devices 1406, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1400 might also include a communications subsystem 1412, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1412 may permit data to be exchanged with a network, other computer systems, and/or any other devices described herein. In many embodiments, the computer system 1400 will further comprise a non-transitory working memory 1418, which can include a RAM or ROM device, as described above.

The computer system 1400 also can comprise software elements, shown as being currently located within the working memory 1418, including an operating system 1414, device drivers, executable libraries, and/or other code, such as one or more application programs 1416, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1406 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 1400 may be omitted or may be implemented separate from the illustrated system. For example, the processor 1404 and/or other elements may be implemented separate from the input device 1408. In one embodiment, the processor is configured to receive images from one or more cameras that are separately implemented. In some embodiments, elements in addition to those illustrated in FIG. 14 may be included in the computer system 1400.

Some embodiments may employ a computer system (such as the computer system 1400) to perform methods in accordance with the disclosure. For example, some or all of the procedures of the described methods may be performed by the computer system 1400 in response to processor 1404 executing one or more sequences of one or more instructions (which might be incorporated into the operating system 1414 and/or other code, such as an application program 1416) contained in the working memory 1418. Such instructions may be read into the working memory 1418 from another computer-readable medium, such as one or more of the storage device(s) 1406. Merely by way of example, execution of the sequences of instructions contained in the working memory 1418 might cause the processor(s) 1404 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 1400, various computer-readable media might be involved in providing instructions/code to processor(s) 1404 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1406. Volatile media include, without limitation, dynamic memory, such as the working memory 1418. Transmission media include, without limitation, coaxial cables, copper wire and fiber optics, including the wires that comprise the bus 1402, as well as the various components of the communications subsystem 1412 (and/or the media by which the communications subsystem 1412 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1404 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals and/or the like, are all examples of carrier waves on which instructions can be encoded, in accordance with various embodiments of the invention.

The communications subsystem 1412 (and/or components thereof) generally will receive the signals, and the bus 1402 then might carry the signals (and/or the data, instructions, etc. carried by the signals) to the working memory 1418, from which the processor(s) 1404 retrieves and executes the instructions. The instructions received by the working memory 1418 may optionally be stored on a non-transitory storage device 1406 either before or after execution by the processor(s) 1404.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 1404—configured to perform the functions or methods. Further, such functions or methods may be performed by a processor executing instructions stored on one or more computer readable media.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method, comprising:
    detecting a first user gesture meeting a first condition to enter a command mode on a computing device, wherein detecting the first user gesture includes tracking the first user gesture over a first period of time;
    exiting the command mode;
    detecting a second user gesture of a plurality of user gestures, the second user gesture meeting a second condition to reenter the command mode based on the detecting the first user gesture, wherein detecting the second user gesture includes tracking the second user gesture over a second period of time, wherein:
        other user gestures of the plurality of user gestures do not meet the second condition;
        the second condition is less stringent than the first condition;
        the first user gesture and the second user gesture are performed by a user extremity; and
        the computing device need not be in contact with the user extremity during the detecting the first user gesture and the detecting the second user gesture.

2. The method of claim 1 wherein tracking the first user gesture or the second user gesture comprises using one or more of depth sensor tracking, 2-D sensor tracking, histogram tracking, and ultrasound sensor tracking.

3. The method of claim 1 wherein the command mode comprises executing one or more commands of the mobile device in response to detecting the other user gestures.

4. The method of claim 1 wherein the detecting the first user gesture or the second user gesture comprises obtaining a plurality of images using an image sensor.

5. The method of claim 1 wherein the first and second user gestures are fixed gestures.

6. The method of claim 1 wherein the first and second user gestures are dynamic gestures.

7. The method of claim 1 wherein the second period of time is shorter than the first period of time.

8. The method of claim 1 wherein the first condition is detecting the first user gesture within a first region and the second condition is detecting the second user gesture within a second region, wherein the second region is larger than or equal to the first region.

9. The method of claim 8 wherein the detecting the first user gesture comprises determining whether the user extremity is steady within the first region by detecting that any movement associated with the user extremity is below a predefined movement threshold in the first region for a period of time.

10. The method of claim 9 wherein the user extremity is a hand.

11. The method of claim 1 wherein the first condition is detecting the first user gesture to a first confidence level and wherein the second condition is detecting the second user gesture to a second confidence level, wherein the second confidence level is lower than the first confidence level.

12. The method of claim 1 further comprising providing feedback indicating reentering the gesture tracking mode in response to the detecting.

13. The method of claim 1:
    wherein the second condition comprises a command corresponding to the second user gesture being equivalent to a command corresponding to a gesture performed between the first user gesture and the second user gesture; and
    further comprising bypassing a requirement for the second user gesture to meet the first condition based at least in part on the detecting the second user gesture meeting the second condition.

14. The method of claim 1, wherein the first condition comprises a motion or trajectory in a first direction, and wherein the second condition comprises a change in direction such that a resulting direction of motion is substantially aligned with the first direction.

15. An apparatus, comprising:
    an image capture device configured to capture images; and
    a processor coupled to the image capture device, wherein the processor is configured to:
        detect a first user gesture meeting a first condition to enter a command mode, wherein detecting the first user gesture includes tracking the first user gesture over a first period of time;
        exit the gesture tracking mode;
        detect, based on images captured by the image capture device, a second user gesture of a plurality of user gestures, the second user gesture meeting a second condition to reenter the command mode based on the detecting the first user gesture, wherein detecting the second user gesture includes tracking the second user gesture over a second period of time, wherein:
            other user gestures of the plurality of user gestures do not meet the second condition;
            the second condition is less stringent than the first condition;
            the first user gesture and the second user gesture are performed by a user extremity; and
            the computing device need not be in contact with the user extremity during the detecting the first user gesture and the detecting the second user gesture.

16. The apparatus of claim 15 wherein tracking the first user gesture or the second user gesture comprises using one or more of depth sensor tracking, 2-D sensor tracking, histogram tracking, and ultrasound sensor tracking.

17. The apparatus of claim 15 wherein the command mode comprises executing one or more commands of the mobile device in response to detecting the other user gestures.

18. The apparatus of claim 15 wherein the first and second user gestures are fixed gestures.

19. The apparatus of claim 15 wherein the first and second user gestures are dynamic gestures.

20. The apparatus of claim 15 wherein the second period of time is shorter than the first period of time.

21. The apparatus of claim 15 wherein the first condition is detecting the first user gesture within a first region and the second condition is detecting the second user gesture within a second region, wherein the second region is larger than or equal to the first region.

22. The apparatus of claim 21 wherein the processor is configured to detect the first user gesture by determining whether the user extremity is steady within the first region by detecting that any movement associated with the user extremity is below a predefined movement threshold in the first region for a period of time.

23. The apparatus of claim 22 wherein the user extremity is a hand.

24. The apparatus of claim 15 wherein the first condition is detecting the first user gesture to a first confidence level and wherein the second condition is detecting the second user gesture to a second confidence level, wherein the second confidence level is lower than the first confidence level.

25. The apparatus of claim 15 wherein the processor is further configured to cause an output device to provide feedback indicating reentering the gesture tracking mode in response to the detecting the second user gesture meeting the second condition.

26. The apparatus of claim 15 wherein the second condition comprises a command corresponding to the second user gesture being equivalent to a command corresponding to a gesture performed between the first user gesture and the second user gesture; and
    wherein the processor is further configured to bypass a requirement for the second user gesture to meet the first condition based at least in part on the detecting the second user gesture meeting the second condition.

27. The apparatus of claim 15, wherein the first condition comprises a motion or trajectory in a first direction, and wherein the second condition comprises a change in direction such that a resulting direction of motion is substantially aligned with the first direction.

28. An apparatus, comprising:
    means for detecting a first user gesture meeting a first condition to enter a gesture tracking mode, wherein the means for detecting a first user gesture includes a means for tracking the first user gesture over a first period of time;
    means for exiting the command mode;
    means for detecting a second user gesture of a plurality of user gestures, the second user gesture meeting a second condition to reenter the command mode based on the detecting the first user gesture, wherein the means for detecting the second user gesture includes a means for tracking the second user gesture over a second period of time, wherein:
    other user gestures of the plurality of user gestures do not meet the second condition;
    the second condition is less stringent than the first condition;
    the first user gesture and the second user gesture are performed by a user extremity; and
    the computing device need not be in contact with the user extremity during the detecting the first user gesture and the detecting the second user gesture.

29. The apparatus of claim 28 wherein command mode comprises executing one or more commands of the mobile device in response to detecting the other user gestures.

30. The apparatus of claim 28 wherein the second period of time is shorter than the first period of time.

31. The apparatus of claim 28 wherein the first condition is detecting the first user gesture within a first region and the second condition is detecting the second user gesture within a second region, wherein the second region is larger than or equal to the first region.

32. A non-transitory processor-readable medium comprising processor-readable instructions configured to cause a processor to:
    detect a first user gesture meeting a first condition to enter a command mode, wherein detecting the first user gesture includes tracking the first user gesture over a first period of time;
    exit the command mode; and
    detect a second user gesture of a plurality of user gestures, the second user gesture meeting a second condition to reenter the gesture tracking mode based on the detecting the first user gesture, wherein detecting the second user gesture includes tracking the second user gesture over a second period of time, wherein:
    user gestures of the plurality of user gestures not meeting the second condition;
    the second condition is less stringent than the first condition;
    the first user gesture and the second user gesture are performed by a user extremity; and
    the computing device need not be in contact with the user extremity during the detecting the first user gesture and detecting the second user gesture.

* * * * *